US011652518B2

(12) United States Patent
Wang et al.

(10) Patent No.: US 11,652,518 B2
(45) Date of Patent: *May 16, 2023

(54) CHANNEL ESTIMATION METHOD AND APPARATUS

(71) Applicant: HUAWEI TECHNOLOGIES CO., LTD., Guangdong (CN)

(72) Inventors: Xiaohan Wang, Shanghai (CN); Huangping Jin, Shanghai (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,478

(22) Filed: Sep. 27, 2021

(65) Prior Publication Data
US 2022/0021425 A1 Jan. 20, 2022

Related U.S. Application Data

(63) Continuation of application No. 17/094,252, filed on Nov. 10, 2020, now Pat. No. 11,133,847, which is a
(Continued)

(30) Foreign Application Priority Data

May 11, 2018 (CN) .......................... 201810455124.7

(51) Int. Cl.
*H04B 7/02* (2018.01)
*H04B 7/0456* (2017.01)
*H04L 25/02* (2006.01)

(52) U.S. Cl.
CPC ....... *H04B 7/0456* (2013.01); *H04L 25/0202* (2013.01)

(58) Field of Classification Search
CPC .. H04B 7/0456; H04B 7/0639; H04B 7/0478; H04B 7/0626; H04B 7/0634;
(Continued)

(56) References Cited

U.S. PATENT DOCUMENTS 9,425,871 B2 8/2016 Onggosanusi et al.
2009/0052357 A1 2/2009 Suo et al.
(Continued)

FOREIGN PATENT DOCUMENTS

CN 101388699 3/2009
CN 103117818 5/2013
(Continued)

OTHER PUBLICATIONS

3GPP TS 38.214 V15.1.0 (Mar. 2018), "3rd Generation Partnership Project; Technical Specification Group Radio Access Network; NR; Physical layer procedures for data (Release 15)," Mar. 2018, 77 pages.
(Continued)

*Primary Examiner* — Helene E Tayong
(74) *Attorney, Agent, or Firm* — Fish & Richardson P.C.

(57) ABSTRACT

This application discloses a channel estimation method and apparatus, and relates to the field of communications technologies, to help reduce indication overheads. The method may include: generating and sending indication information. The indication information is used to indicate K N-dimensional spatial-domain component vectors, L M-dimensional frequency-domain component vectors, and a weight matrix, to indicate to construct an M×N-dimensional spatial-frequency matrix, or an M×N or N×M spatial-frequency matrix.

42 Claims, 3 Drawing Sheets

Related U.S. Application Data continuation of application No. PCT/CN2019/085310, filed on Apr. 30, 2019.

(58) Field of Classification Search
CPC .. H04B 7/0645; H04B 7/0658; H04B 7/0695; H04B 7/068; H04B 7/0842; H04L 25/0202; H04L 25/022; H04L 25/0204; H04L 27/26; H04L 27/2695
USPC .......................................................... 375/267
See application file for complete search history.

(56) References Cited

U.S. PATENT DOCUMENTS

| | | | |
|---|---|---|---|
| 2010/0284351 A1* | 11/2010 | Liang | H04B 7/0639 370/329 |
| 2011/0249637 A1 | 10/2011 | Hammarwall et al. | |
| 2014/0226702 A1 | 8/2014 | Onggosanusi et al. | |
| 2016/0065279 A1* | 3/2016 | Wang | H04L 5/0048 375/267 |
| 2017/0099093 A1 | 4/2017 | Zhang et al. | |
| 2017/0294945 A1* | 10/2017 | Liu | H04L 1/20 |

FOREIGN PATENT DOCUMENTS

| | | |
|---|---|---|
| CN | 104639218 | 5/2015 |
| CN | 104982060 | 10/2015 |
| CN | 107370558 | 11/2017 |
| CN | 107733485 | 2/2018 |
| EP | 3737052 | 11/2020 |
| WO | 2016078591 | 5/2016 |
| WO | 2017190356 | 11/2017 |

OTHER PUBLICATIONS

Extended European Search Report issued in European Application No. 19800589.4 dated May 26, 2021, 12 pages.
Fraunhofer IIS, Fraunhofer HHI, "Enhancements on Type-II CSI Reporting Scheme," 3GPP TSG-RAN WG1 #92-Bis, R1-1804118, Sanya, China, Apr. 16-20, 2018, 4 pages.
Office Action issued in Chinese Application No. 201810455124.7 dated May 22, 2020, 10 pages (with English translation).
PCT International Search Report and Written Opinion issued in International Application No. PCT/CN2019/085310 dated Jul. 31, 2019, 17 pages (with English translation).
ZTE, "Type II CSI feedback based on linear combination," 3GPP TSG RAN WG1 Meeting #88bis, R1-1707127, Hangzhou, China, May 15-19, 2017, 14 pages.

* cited by examiner

CHANNEL ESTIMATION METHOD AND APPARATUS

CROSS-REFERENCE TO RELATED APPLICATIONS

This application is a continuation of U.S. patent application Ser. No. 17/094,252, filed on Nov. 10, 2020, now U.S. Pat. No. 11,133,847, which is a continuation of International Application No. PCT/CN2019/085310, filed on Apr. 30, 2019. The International Application claims priority to Chinese Patent Application No. 201810455124.7, filed on May 11, 2018. All of the afore-mentioned patent applications are hereby incorporated by reference in their entireties.

TECHNICAL FIELD

This application relates to the field of communications technologies, and in particular, to a channel estimation method and apparatus.

BACKGROUND

Emergence of a multiple-input multiple-output (multiple input multiple output, MIMO) technology has brought revolutionary changes to wireless communications. Through deployment of a plurality of antennas on a transmit end device and a receive end device, the MIMO technology can significantly improve performance of a wireless communications system. For example, in a diversity scenario, the MIMO technology can effectively improve transmission reliability; in a multiplexing scenario, the MIMO technology can greatly improve a transmission throughput.

A precoding technology is usually used in a MIMO system to improve a channel, to improve a spatial multiplexing (spatial multiplexing) effect. In the precoding technology, a precoding matrix matching a channel is used to process a data stream to be spatially multiplexed (spatial stream for short below), to precode the channel and improve receiving quality of the spatial stream.

Each spatial stream to be spatially multiplexed corresponds to one column vector in the precoding matrix. In a precoding process, the transmit end device precodes the spatial stream by using the column vector. Therefore, the column vector may also be referred to as a precoding vector. The precoding vector may be determined by the receive end device based on a spatial-domain basis vector set, and indicated to the transmit end device. The spatial-domain basis vector set is a set of a series of spatial-domain basis vectors, and each spatial-domain basis vector corresponds to a beam direction of the transmit end device. A spatial-domain basis vector best matching a channel, or a weighted sum of a plurality of spatial-domain basis vectors may be used as a precoding vector. Alternatively, adjustment (for example, but not limited to reconstruction) is performed on the precoding vector, and the adjusted precoding vector is used for precoding. Usually, there may be a plurality of spatial streams to be spatially multiplexed, and precoding vectors of these spatial streams correspond to column vectors of the precoding matrix.

The foregoing precoding vector is usually a precoding vector used to precode a spatial stream in a frequency band. The receive end device usually needs to indicate, to the transmit end device, precoding vectors corresponding to a plurality of frequency bands, and a precoding vector corresponding to each frequency band is independently indicated. Consequently, indication overheads are relatively high.

SUMMARY

Embodiments of this application provide a channel estimation method and apparatus, to help reduce indication overheads.

According to a first aspect, an embodiment of this application provides a channel estimation method. The method may include: generating indication information, where the indication information is used to indicate K N-dimensional spatial-domain component vectors, L M-dimensional frequency-domain component vectors, and a weight matrix, to indicate to construct an M×N-dimensional spatial-frequency matrix, or an M×N or N×M spatial-frequency matrix, where the spatial-frequency matrix includes M N-dimensional precoding vectors, each precoding vector is applied to one of M frequency bands, the spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, where M≥1, N≥2, K≥1, L≥1, and M, N, K, and L are all integers; and sending the indication information. It can be learned that, because the M N-dimensional precoding vectors may form a spatial-frequency matrix, and the spatial-frequency matrix is generated by performing weighted combination on a plurality of spatial-frequency component matrices, a condition may be created for reducing indication overheads of the precoding vectors. In addition, in the technical solution provided in this embodiment of this application, the spatial-frequency matrix is specifically indicated by indicating "the K N-dimensional spatial-domain component vectors, the L M-dimensional frequency-domain component vectors, and the weight matrix" that are used to construct the plurality of spatial-frequency component matrices. Therefore, compared with a prior-art technical solution of independently indicating a precoding vector corresponding to each frequency band, the technical solution provided in this embodiment of this application helps reduce the indication overheads. For example, if K<N and/or L<M, because related information of the precoding vector corresponding to each frequency band is independently indicated in the prior art, related information for constructing an N×M (or M×N) matrix needs to be indicated. In this example, it is necessary to indicate only related information for constructing a K×L (or an L×K) matrix. Therefore, the indication overheads can be reduced.

According to a second aspect, an embodiment of this application provides a channel estimation method. The method may include: receiving indication information, where the indication information is used to indicate K N-dimensional spatial-domain component vectors, L M-dimensional frequency-domain component vectors, and a weight matrix, to indicate to construct an M×N-dimensional spatial-frequency matrix, or an M×N or N×M spatial-frequency matrix, where the spatial-frequency matrix includes M N-dimensional precoding vectors, each precoding vector is applied to one of M frequency bands, the spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, where $M \geq 1$, $N \geq 2$, $K \geq 1$, $L \geq 1$, and M, N, K, and L are all integers; and determining the spatial-frequency matrix based on the indication information. For a beneficial effect that can be achieved by this method, refer to the first aspect. Details are not described herein again.

Based on the first aspect or the second aspect, amplitudes of elements in the weight matrix form an amplitude matrix; phases of the elements in the weight matrix form a phase matrix. Based on this, the embodiments of this application provide following possible designs:

In a possible design, the indication information is specifically used to indicate the following information, to indicate the amplitude matrix: a quantized value of each element in the amplitude matrix relative to a maximum element in the amplitude matrix. This method is easy to implement.

"A quantized value of an element relative to another element" described in this application is a quantized value obtained by first normalizing an element relative to another element and then quantizing the normalized value.

In a possible design, the indication information is specifically used to indicate the following information, to indicate an amplitude matrix: a quantized value of a maximum element in each vector in the amplitude matrix relative to a maximum element in the amplitude matrix, and a quantized value of each element in each vector in the amplitude matrix relative to a maximum element in the vector, where each vector in the amplitude matrix is each row vector or column vector in the amplitude matrix. Optionally, a quantization scheme of the quantized value of the maximum element in each vector in the amplitude matrix relative to the maximum element in the amplitude matrix may be the same as or different from a quantization scheme of the quantized value of each element in each vector in the amplitude matrix relative to the maximum element in the vector. Optionally, quantization schemes of quantized values of elements in different vectors in the amplitude matrix relative to a maximum element in the vector may be the same or may be different.

In a possible design, the indication information is specifically used to indicate the following information, to indicate the amplitude matrix: a quantized value of each row vector in the amplitude matrix relative to a maximum row vector, and a quantized value of each column vector in the amplitude matrix relative to a maximum column vector. For example, a row vector including the maximum element in the amplitude matrix is the maximum row vector; a row vector including a maximum sum of elements is the maximum row vector; or a row vector including a maximum sum of squares of elements is the maximum row vector.

In a possible design, the indication information is specifically used to indicate the following information, to indicate the amplitude matrix: a quantization scheme corresponding to each vector in the amplitude matrix, and a quantized value of each element in the vector based on the quantization scheme, where each vector in the amplitude matrix is each row vector or column vector in the amplitude matrix. This manner helps improve quantization precision of a more important element, and reduce quantization bit overheads of a less important element, to improve overall performance.

In a possible design, the indication information is specifically used to indicate the following information, to indicate the amplitude matrix: a first location set in the amplitude matrix, a quantized value of an element corresponding to the first location set, and a quantized value of an element in the amplitude matrix other than the element corresponding to the first location set, where a quantization scheme of the element corresponding to the first location set is different from a quantization scheme of the other element in the amplitude matrix. The first location set may include a set formed by locations of any one or more elements in the amplitude matrix. For example, the first location set may be a submatrix in the amplitude matrix. It can be learned that, in this application, different elements in the amplitude matrix may have different quantization schemes.

In a possible design, the indication information is specifically used to indicate the following information, to indicate the phase matrix: a second location set in the phase matrix, a quantized value of an element corresponding to the second location set, and a quantized value of an element in the phase matrix other than the element corresponding to the second location set, where a quantization scheme of the element corresponding to the second location set is different from a quantization scheme of the other element in the phase matrix. It can be learned that, in this application, different elements in the phase matrix may have different quantization schemes.

In a possible design, a location of the second location set in the phase matrix is the same as a location of the first location set in the amplitude matrix. In other words, the location of the second location set in the phase matrix may be implicitly indicated by indicating the location of the first location set in the amplitude matrix. In this way, signaling overheads can be reduced.

In a possible design, a quantity of quantization bits of the quantized value of the element corresponding to the first location set is greater than a quantity of quantization bits of the quantized value of the other element in the amplitude matrix, and a quantity of quantization bits of the quantized value of the element corresponding to the second location set is greater than a quantity of quantization bits of the quantized value of the other element in the phase matrix. In other words, for different weights in the weight matrix, a larger quantity of quantization bits may be used to quantize an amplitude of a weight with a larger amplitude, and a larger quantity of quantization bits may be used to quantize a phase of the weight. This helps improve precoding precision, and improve overall performance of a system.

In a possible design, the L frequency-domain component vectors are selected from a frequency-domain component vector set, and the frequency-domain component vector set includes at least two frequency-domain component vector subsets; and the indication information includes an index of a frequency-domain component vector subset to which the L frequency-domain component vectors belong and indexes of the L frequency-domain component vectors, to indicate the L M-dimensional frequency-domain component vectors. Optionally, the frequency-domain component vector is an oversampled discrete fourier transform (discrete fourier transform, DFT) vector or a vector formed by some elements in an oversampled DFT vector. In this possible design, a manner of designing and indicating the frequency-domain component vector is provided.

In a possible design, the L frequency-domain component vectors are selected from a frequency-domain component vector set, and the frequency-domain component vector set includes at least two frequency-domain component vectors; and the indication information includes indexes of the L frequency-domain component vectors, to indicate the L M-dimensional frequency-domain component vectors. Optionally, the frequency-domain component vector is a DFT vector or a vector formed by some elements in a DFT vector. In this possible design, another manner of designing and indicating the frequency-domain component vector is provided.

In a possible design, a quantity of DFT points of the oversampled DFT vector (or the DFT vector) is determined based on Nsb, and Nsb is a quantity of frequency bands into which system bandwidth is divided, or a quantity of frequency bands corresponding to channel information to be fed back. An optional quantity of DFT points is Nsb or $2^{\lceil \log_2 Nsb \rceil}$, or is determined based on a correspondence between a quantity of DFT points and Nsb.

According to a third aspect, an embodiment of this application provides a channel estimation apparatus. The channel estimation apparatus may be configured to perform the method provided in the first aspect. The channel estimation apparatus may be specifically a receive end device, for example, a network device or a terminal.

In a possible design, the channel estimation apparatus may be divided into function modules according to the method provided in the first aspect. For example, each function module may be obtained through division based on each corresponding function, or two or more functions may be integrated into one processing module.

In another possible design, the channel estimation apparatus may include a memory and a processor, where the memory is configured to store a computer program. When the computer program is executed by the processor, the method provided in the first aspect is performed.

According to a fourth aspect, an embodiment of this application provides a channel estimation apparatus. The channel estimation apparatus may be configured to perform the method provided in the second aspect. The channel estimation apparatus may be specifically a transmit end device, for example, a terminal or a network device.

In a possible design, the channel estimation apparatus may be divided into function modules based on the method provided in the second aspect. For example, each function module may be obtained through division based on each corresponding function, or two or more functions may be integrated into one processing module.

In another possible design, the channel estimation apparatus may include a memory and a processor. The memory is configured to store a computer program. When the computer program is executed by the processor, the method provided in the second aspect is performed.

It should be noted that the memory and the processor described in this embodiment of this application may be integrated into one chip, or may be separately disposed on different chips. A type of the memory and a manner of disposing the memory and the processor are not limited in this embodiment of this application.

According to a fifth aspect, an embodiment of this application provides a processor, where the processor may include:

at least one circuit, configured to generate indication information, where for a related explanation of the indication information, refer to the manner provided in the first aspect; and at least one circuit, configured to send the indication information by using a transmitter.

According to a sixth aspect, an embodiment of this application provides a processor, where the processor may include:

at least one circuit, configured to receive indication information by using a receiver, where for a related explanation of the indication information, refer to the manner provided in the second aspect; and at least one circuit, configured to determine the foregoing spatial-frequency matrix based on the indication information.

According to a seventh aspect, an embodiment of this application provides a processing device, including a transmitter and a processor. The processor is configured to generate indication information, and transmit the indication information by using the transmitter. For a related explanation of the indication information, refer to the manner provided in the first aspect.

According to an eighth aspect, an embodiment of this application provides a processing device, including a receiver and a processor. The processor is configured to receive indication information by using the receiver, where for a related explanation of the indication information, refer to the manner provided in the second aspect. The processor may be further configured to determine the foregoing spatial-frequency matrix based on the indication information.

In a specific implementation process, the processor may be configured to perform, for example, but not limited to, baseband-related processing, and the receiver and the transmitter may be separately configured to perform, for example, but not limited to, radio frequency receiving and sending. The foregoing components may be separately disposed on chips independent of each other, or at least some or all of the components may be disposed on a same chip. For example, the receiver and the transmitter may be disposed on a receiver chip and a transmitter chip that are independent of each other, or may be integrated into a transceiver and then disposed on a transceiver chip. For another example, the processor may be further classified into an analog baseband processor and a digital baseband processor. The analog baseband processor and the transceiver may be integrated into a same chip, and the digital baseband processor may be disposed on an independent chip. With continuous development of integrated circuit technologies, more components can be integrated on a same chip. For example, the digital baseband processor and a plurality of types of application processors (for example, but not limited to, a graphics processor and a multimedia processor) may be integrated on a same chip. Such a chip may be referred to as a system on chip (System on Chip). Whether all the components are independently disposed on different chips or integrated and disposed on one or more chips usually depends on a specific requirement on product design. A specific implementation form of the components is not limited in this embodiment of this application.

An embodiment of this application further provides a computer-readable storage medium, where the computer-readable storage medium stores a computer program. When the computer program is run on a computer, the computer is enabled to perform the method provided in either of the first aspect and the second aspect.

An embodiment of this application further provides a computer program product. When the computer program product runs on a computer, the method provided in the first aspect or the second aspect is performed.

This application further provides a communications chip, where the communications chip stores an instruction. When the instruction is run on a network device or a terminal, the network device or the terminal is enabled to perform the method provided in the first aspect or the second aspect.

It may be understood that the channel estimation apparatus, the processor, the processing device, the computer-readable storage medium, the computer program product, or the like provided above is configured to perform the corresponding method provided above. Therefore, for beneficial effects that can be achieved by the channel processing apparatus, the processor, the processing device, the computer-readable storage medium, the computer program product, or the like, refer to the beneficial effects in the corresponding methods. Details are not described herein again.

It should be noted that, the foregoing devices that are provided in the embodiments of this application and that are configured to store the computer instruction or the computer program, for example, but not limited to, the foregoing memory, computer-readable storage medium, and communications chip, are all non-transitory (non-transitory).

According to a ninth aspect, an embodiment of this application provides an indication method. The method may include: generating indication information, where the indication information is used to indicate one or more frequency-domain component vector subsets and one or more frequency-domain component vectors in the one or more frequency-domain component vector subsets, the frequency-domain component vector subset is a subset of a frequency-domain component vector set, and the frequency-domain component vector set includes at least two frequency-domain component vector subsets; and sending the indication information. The method provides a method for indicating a frequency-domain component vector, and may be applied to, for example, but not limited to, a channel estimation scenario.

According to a tenth aspect, an embodiment of this application provides an information determining method. The method may include: receiving indication information, where the indication information is specifically used to indicate one or more frequency-domain component vector subsets and one or more frequency-domain component vectors in the one or more frequency-domain component vector subsets, the frequency-domain component vector subset is a subset of a frequency-domain component vector set, and the frequency-domain component vector set includes at least two frequency-domain component vector subsets; and determining the one or more frequency-domain component vectors based on the indication information.

Based on the ninth aspect or the tenth aspect, the embodiments of this application provide the following possible implementations:

In a possible design, the frequency-domain component vector is an oversampled discrete fourier transform DFT vector or a vector formed by some elements in an oversampled DFT vector.

In a possible design, a quantity of DFT points of the oversampled DFT vector is determined based on Nsb, and Nsb is a quantity of frequency bands into which system bandwidth is divided, or a quantity of frequency bands corresponding to channel information to be fed back.

In a possible design, the quantity of DFT points is Nsb or $2^{\lceil \log_2 Nsb \rceil}$, or is determined based on a correspondence between a quantity of DFT points and Nsb.

According to an eleventh aspect, an embodiment of this application provides an indication apparatus. The indication apparatus may be configured to perform the method provided in the ninth aspect. The channel estimation apparatus may be specifically a receive end device, for example, a network device or a terminal.

In a possible design, the indication apparatus may be divided into function modules based on the method provided in the ninth aspect. For example, each function module may be obtained through division based on each corresponding function, or two or more functions may be integrated into one processing module.

In another possible design, the channel estimation apparatus may include a memory and a processor, where the memory is configured to store a computer program. When the computer program is executed by the processor, the method provided in the ninth aspect is performed.

According to a twelfth aspect, an embodiment of this application provides a channel estimation apparatus. The channel estimation apparatus may be configured to perform the method provided in the ninth aspect. The channel estimation apparatus may be specifically a transmit end device, for example, a terminal or a network device.

In a possible design, the channel estimation apparatus may be divided into function modules based on the method provided in the tenth aspect. For example, each function module may be obtained through division based on each corresponding function, or two or more functions may be integrated into one processing module.

In another possible design, the channel estimation apparatus may include a memory and a processor, where the memory is configured to store a computer program. When the computer program is executed by the processor, the method provided in the tenth aspect is performed.

According to a thirteenth aspect, an embodiment of this application provides a processor, where the processor may include:

at least one circuit, configured to generate indication information, where for a related explanation of the indication information, refer to the manner provided in the ninth aspect; and at least one circuit, configured to send the indication information by using a transmitter.

According to a fourteenth aspect, an embodiment of this application provides a processor, where the processor may include:

at least one circuit, configured to receive indication information by using a receiver, where for a related explanation of the indication information, refer to the manner provided in the tenth aspect; and at least one circuit, configured to determine one or more frequency-domain component vectors in the tenth aspect based on the indication information.

According to a fifteenth aspect, an embodiment of this application provides a processing device, including a transmitter and a processor. The processor is configured to generate indication information, and transmit the indication information by using the transmitter. For a related explanation of the indication information, refer to the manner provided in the ninth aspect.

According to a sixteenth aspect, an embodiment of this application provides a processing device, including a receiver and a processor. The processor is configured to receive indication information by using the receiver. For a related explanation of the indication information, refer to the manner provided in the tenth aspect. The processor may be further configured to determine one or more frequency-domain component vectors in the tenth aspect based on the indication information.

An embodiment of this application further provides a computer-readable storage medium, where the computer-readable storage medium stores a computer program. When the computer program is run on a computer, the computer is enabled to perform the method provided in the ninth aspect or the tenth aspect.

An embodiment of this application further provides a computer program product. When the computer program product is run on a computer, the method provided in the ninth aspect or the tenth aspect is performed.

This application further provides a communications chip, where the communications chip stores an instruction. When the instruction is run on a network device or a terminal, the network device or the terminal is enabled to perform the method provided in the ninth aspect or the tenth aspect.

It may be understood that any indication apparatus, information determining apparatus, processor, processing device, computer-readable storage medium, or computer program product, or the like provided above is configured to perform the corresponding method provided above. Therefore, for beneficial effects that can be achieved by the indication apparatus, information determining apparatus, processor, processing device, computer-readable storage medium, or computer program product, or the like, refer to the beneficial effects of the corresponding methods. Details are not described herein again.

DESCRIPTION OF EMBODIMENTS

Technical solutions provided in this application can be applied to various communications systems. The technical solutions provided in this application may be applied to a 5G communications system, a future evolved system, a plurality of types of communication convergence systems, or the like, or may be applied to an existing communications system or the like. There may be a plurality of types of application scenarios of the technical solutions provided in this application, for example, scenarios such as machine to machine (machine to machine, M2M), macro-micro communication, enhanced mobile broadband (enhanced mobile broadband, eMBB), ultra-reliable low-latency communication (ultra reliable & low latency communication, uRLLC), and massive machine-type communications (massive machine type communication, mMTC). These scenarios may include but are not limited to a scenario of communication between terminals, a scenario of communication between network devices, a scenario of communication between a network device and a terminal, and the like. The following provides descriptions by using an example in which the technical solutions are applied to the scenario of communication between a network device and a terminal.

Figure 1:
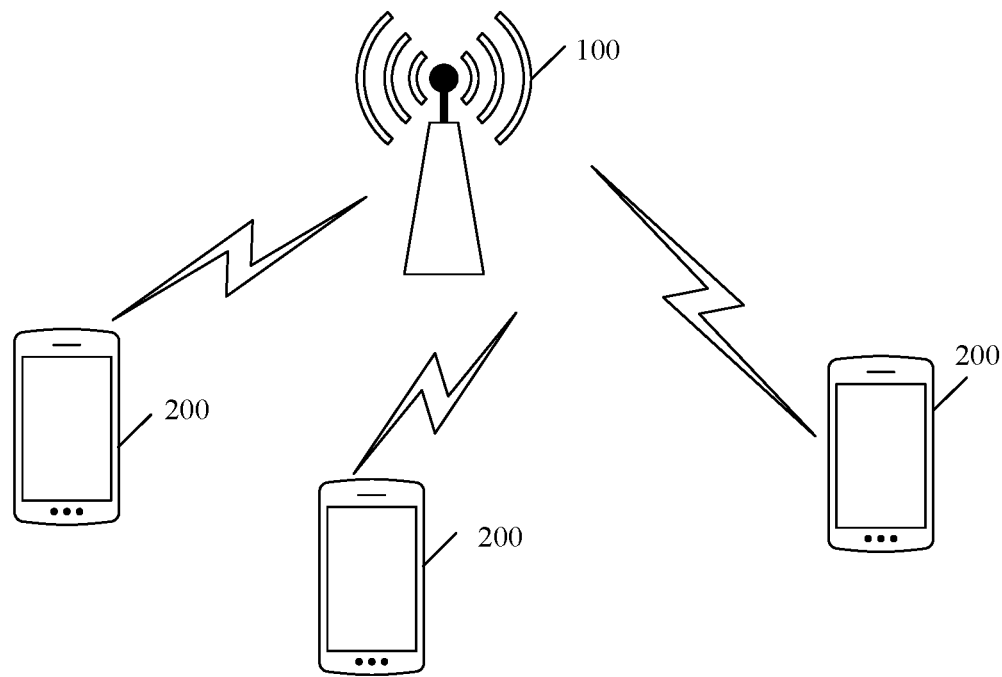
FIG. 1 is a schematic architectural diagram of a communications system to which technical solutions provided in embodiments of this application are applicable.

FIG. 1 is a schematic diagram of a communications system to which the technical solutions provided in this application are applicable. The communications system may include one or more network devices 100 (only one is shown) and one or more terminals 200 connected to each network device 100. FIG. 1 is merely a schematic diagram, and does not constitute a limitation on an applicable scenario of the technical solutions provided in this application.

The network device 100 may be a transmission reception point (transmission reception point, TRP), a base station, a relay station, an access point, or the like. The network device 100 may be a network device in a 5G communications system or a network device in a future evolved network; or may be a wearable device, a vehicle-mounted device, or the like. In addition, the network device 100 may alternatively be a base transceiver station (base transceiver station, BTS) in global system for mobile communications (global system for mobile communication, GSM) or code division multiple access (code division multiple access, CDMA) networks, or may be an NB (NodeB) in wideband code division multiple access (wideband code division multiple access, WCDMA), or may be an eNB or an eNodeB (evolutional NodeB) in long term evolution (long term evolution, LTE). The network device 100 may alternatively be a radio controller in a cloud radio access network (cloud radio access network, CRAN) scenario.

The terminal 200 may be user equipment (user equipment, UE), an access terminal, a UE unit, UE station, a mobile station, a remote station, a remote terminal, a mobile device, UE terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal in a 5G network, a terminal in a future evolved public land mobile network (public land mobile network, PLMN) network, or the like.

Optionally, each network element (for example, the network device 100 and the terminal 200) in FIG. 1 may be implemented by one device, or may be jointly implemented by a plurality of devices, or may be a function module in a device. This is not specifically limited in the embodiments of this application. It may be understood that the foregoing function may be a network element in a hardware device, or may be a software function running on dedicated hardware, or may be a virtualization function instantiated on a platform (for example, a cloud platform).

Figure 2:
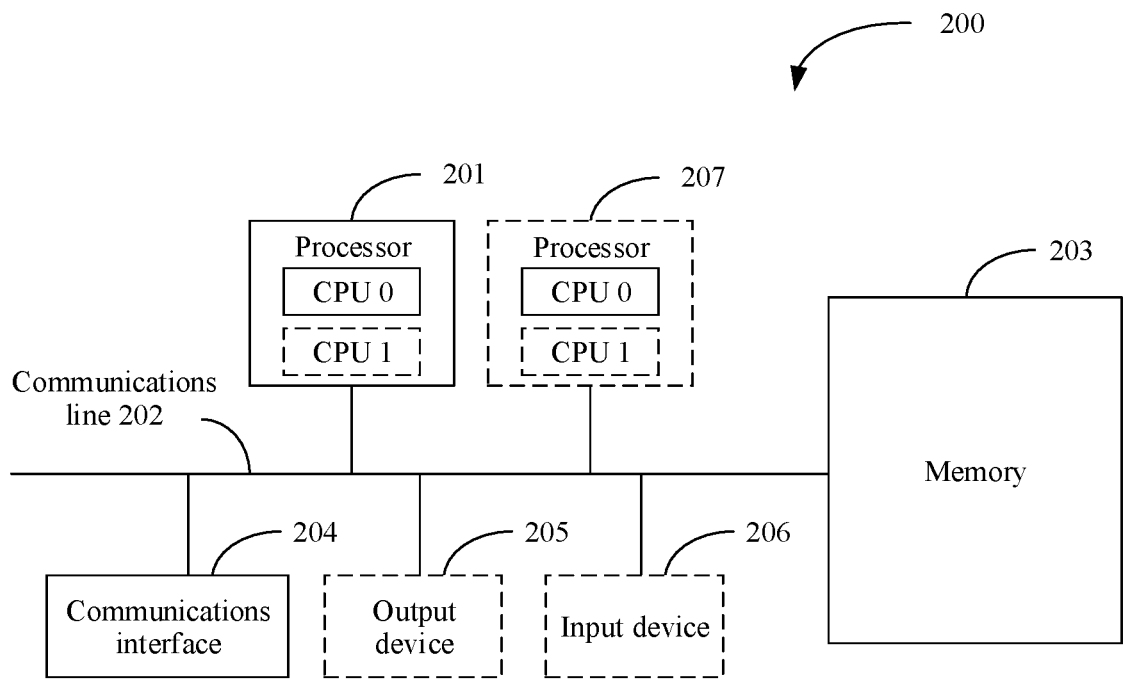
FIG. 2 is a schematic structural diagram of a communications device according to an embodiment of this application.

For example, each network element in FIG. 1 may be implemented by the communications device 200 in FIG. 2. FIG. 2 is a schematic structural diagram of hardware of a communications device according to an embodiment of this application. The communications device 200 includes at least one processor 201, a communications line 202, a memory 203, and at least one communications interface 204.

The processor 201 may be a central processing unit (central processing unit, CPU), a microprocessor, an application-specific integrated circuit (application-specific integrated circuit, ASIC), or one or more integrated circuits that are configured to control execution of a program in a solution of this application.

The communications line 202 may include a path for transmitting information between the foregoing components.

The communications interface 204, which uses any type of apparatus such as a transceiver, is configured to communicate with another device or communications network, such as Ethernet, a RAN, or a wireless local area network (wireless local area networks, WLAN).

The memory 203 may be a read-only memory (read-only memory, ROM) or another type of static storage device that can store static information and instructions, or random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory 203 is not limited thereto. The memory may exist independently and is connected to the processor by using the communications line 202, or the memory may be integrated with the processor. The memory provided in the embodiments of this application may usually be non-volatile. The memory 203 is configured to store a computer-executable instruction for executing the solutions of this application, and the processor 201 controls the execution. The processor 201 is configured to execute the computer-executable instruction stored in the memory 203, to implement the method provided in the following embodiments of this application.

Optionally, in the embodiments of this application, the computer-executable instruction may also be referred to as application program code. This is not specifically limited in the embodiments of this application.

During specific implementation, in an embodiment, the processor 201 may include one or more CPUs, for example, a CPU 0 and a CPU 1 in FIG. 2.

During specific implementation, in an embodiment, the communications device 200 may include a plurality of processors, for example, the processor 201 and a processor 207 in FIG. 2. Each of the processors may be a single-core (single-CPU) processor, or may be a multi-core (multi-CPU) processor. The processor herein may refer to one or more devices, circuits, and/or processing cores configured to process data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, or a projector (projector). The input device 206 communicates with the processor 201, and may receive an input from a user in a plurality of manners. For example, the input device 206 may be a mouse, a keyboard, a touchscreen device, a sensing device, or the like.

The foregoing communications device 200 may be a general-purpose device or a dedicated device. In specific implementation, the communications device 200 may be a desktop computer, a portable computer, a network server, a personal digital assistant (personal digital assistant, PDA), a mobile phone, a tablet computer, a wireless terminal device, an embedded device, or a device having a structure similar to that in FIG. 2. A type of the communications device 200 is not limited in the embodiments of this application.

The technical solutions provided in the embodiments of this application are described with reference to the accompanying drawings.

The following explains and describes related terms and technologies in this application.

It should be noted that, unless otherwise specified, descriptions and the like of related embodiments in this application are all described based on an example of a single polarization direction. Unless otherwise specified, explanations of any term, descriptions of related embodiments, and the like below are described based on an example in which a quantity of layers is 1 (that is, one spatial stream). A unified description is provided herein. Details are not described below again.

(1) Receive End Device and Transmit End Device

The receive end device may be the terminal 200 in FIG. 1, and the transmit end device may be the network device 100 in FIG. 1. Alternatively, the receive end device may be the network device 100 in FIG. 1, and the transmit end device may be the terminal 200 in FIG. 1. The following specific examples in which the transmit end device is a network device and the receive end device is a terminal are used for description.

(2) Frequency Band

System bandwidth (or carrier bandwidth) may be divided into a plurality of frequency bands. A quantity of frequency bands into which the system bandwidth is divided is not limited in this application. In other words, a frequency-domain granularity used during frequency band division is not limited. For example, the frequency-domain granularity may be one or more resource blocks (resource block, RB), or may be one or more subcarriers. In addition, for an implementation of dividing the system bandwidth into the plurality of frequency bands, refer to the prior art. For example, refer to a subband in the LTE standard to understand the frequency band.

This application further relates to "a frequency band corresponding to channel information to be fed back". To be specific, the transmit end device indicates, to the receive end device, the frequency band corresponding to the channel information to be fed back, where a quantity of frequency bands corresponding to the channel information to be fed back is less than or equal to a quantity of frequency bands included in the system bandwidth.

(3) Spatial-Domain Component Vector and Spatial-Domain Component Vector Set

The spatial-domain component vector may be selected from the spatial-domain component vector set. The spatial-domain component vector set is a set of a series of spatial-domain component vectors. The spatial-domain component vector set may usually be represented in a form of a matrix. The spatial-domain component vector may be a column vector of the matrix. Each spatial-domain component vector may correspond to a transmit beam of the transmit end device.

The spatial-domain component vector set may be, for example, but not limited to, a two-dimensional DFT matrix or an oversampled two-dimensional DFT matrix. Specifically, the spatial-domain component vector may be a column vector of a two-dimensional DFT matrix or a column vector of an oversampled two-dimensional DFT matrix, that is, the spatial-domain component vector may be a two-dimensional DFT vector. The two-dimensional DFT vector may be usually used to describe a beam obtained by superimposing a beam in a horizontal direction and a beam in a vertical direction. Certainly, this application is not limited thereto. A design manner of the spatial-domain component vector set has been described in detail in the prior art, and details are not described herein.

In a specific implementation process, the spatial-domain component vector set may be predefined by both the receive end device and the transmit end device, for example, predefined according to a protocol. Certainly, this application is not limited thereto.

Dimensions of a spatial-domain component vector are the same as dimensions of a precoding vector, which are N. To be specific, each of the spatial-domain component vector and the precoding vector includes N elements. N may be a quantity of transmit antenna ports of the transmit end device in a polarization direction, $N \geq 2$, and N is an integer.

(4) Frequency-Domain Component Vector and Frequency-Domain Component Vector Set

The frequency-domain component vector may be selected from the frequency-domain component vector set. The frequency-domain component vector set is a set of a series of frequency-domain component vectors. The frequency-domain component vector set may usually be represented in a form of a matrix. The frequency-domain component vector may be a column vector of the matrix. Each frequency-domain component vector may correspond to one frequency band change mode of the transmit end device. An implementation principle of such a method for obtaining a frequency-domain component vector through selection may be, for example, but not limited to, an implementation principle of obtaining a spatial-domain component vector by using a beam selection technology. Simply, each frequency band may be represented by using an element corresponding to the frequency band in a frequency-domain component vector. In this way, elements corresponding to frequency bands in the frequency-domain component vector may reflect a frequency band change mode. It may be understood that weighted combination may be performed on several frequency-domain component vectors in the frequency-domain component vector set to obtain a frequency-domain combination vector. The frequency-domain combination vector may correspond to a new frequency band change mode. An implementation principle of the frequency-domain combination vector may be, for example, but not limited to, an implementation principle of obtaining a spatial-domain combination vector by using a beam combination technology.

The frequency band change mode may be used to indicate a change rule of a channel in frequency bands. For example, if elements of a frequency-domain component vector or a frequency-domain combination vector are equal, the frequency-domain component vector may represent a frequency band change mode in which a channel remains unchanged in frequency bands. For example, if adjacent elements of a frequency-domain component vector change greatly, the frequency-domain component vector may represent a frequency band change mode in which a channel changes drastically in frequency bands.

The frequency-domain component vector set may be, for example, but not limited to, a one-dimensional DFT matrix, an oversampled one-dimensional DFT matrix, or a singular value decomposition (singular value decomposition, SVD) unitary matrix. Specifically, the frequency-domain component vector may be a column vector of a one-dimensional DFT matrix, a column vector of an oversampled one-dimensional DFT matrix, or a column vector of an SVD unitary matrix. For an obtaining principle of each frequency-domain component vector in the frequency-domain component vector set, refer to an obtaining principle of each spatial-domain component vector in the spatial-domain component vector set in the prior art.

In a specific implementation process, the frequency-domain component vector set may be predefined by both the receive end device and the transmit end device, for example, predefined according to a protocol. Certainly, this application is not limited thereto.

A dimension of the frequency-domain component vector is M. To be specific, the vector includes M elements, $M \geq 1$, and M is an integer.

(5) Spatial-Frequency Component Matrix

The spatial-frequency component matrix may be constructed based on two vectors, and the two vectors may be constructed based on a spatial-domain component vector and a frequency-domain component vector, respectively. Specifically, one of the two vectors may be one of a spatial-domain component vector and a frequency-domain component vector, or a transformation thereof; the other one of the two vectors may be the other one of the spatial-domain component vector and the frequency-domain component vector, or a transformation thereof. The foregoing transformation may be, for example, but not limited to, transposition, conjugation, and conjugate transposition. For example, the spatial-frequency component matrix may be a product of a spatial-domain component vector and a conjugate transpose vector of a frequency-domain component vector, may be a product of a spatial-domain component vector and a transpose vector of a frequency-domain component vector, may be a product of a frequency-domain component vector and a conjugate transpose vector of a spatial-domain component vector, or may be a product of a frequency-domain component vector and a transpose vector of a spatial-domain component vector. In a specific implementation process, the two vectors for constructing the foregoing spatial-frequency component matrix may be set to a row vector and a column vector. In this case, the spatial-frequency component matrix may be a product of the column vector and the row vector.

The following describes an example in which a spatial-domain component matrix may be a product of a spatial-domain component vector and a conjugate transpose vector of a frequency-domain component vector, or a product of a frequency-domain component vector and a conjugate transpose vector of a spatial-domain component vector. However, a person skilled in the art should understand that a manner of constructing the spatial-domain component matrix is not limited thereto, and another manner may be used to construct the spatial-domain component matrix. For example, but not limited to, the spatial-domain component matrix may be constructed with reference to various manners described above or another manner and by using the spatial-domain component vector and the frequency-domain component vector.

Dimensions of the spatial-frequency component matrix are N×M or M×N. To be specific, the matrix includes N rows and M columns, or includes M rows and N columns.

(6) Spatial-Frequency Component Vector

The spatial-frequency component vector may be a Kronecker product of two vectors. One of the two vectors is constructed based on a spatial-domain component vector, and the other one of the two vectors is constructed based on a frequency-domain component vector. Specifically, one of the two vectors may be the foregoing spatial-domain component vector or a transformation thereof, and the other one of the two vectors may be the foregoing frequency-domain component vector or a transformation thereof. The foregoing transformation may be, for example, but not limited to, transposition, conjugation, and conjugate transposition. For example, a spatial-frequency component vector may be a Kronecker product of a spatial-domain component vector and a frequency-domain component vector, and may be specifically represented as the following formula: $v = u_1 \otimes u_2$. Alternatively, a spatial-frequency component vector may be a Kronecker product of a spatial-domain component vector and a conjugate vector of a frequency-domain component vector, and may be specifically represented as the following formula: $v = u_1 \otimes \bar{u}_2$. Alternatively, a spatial-frequency component vector may be a Kronecker product of a conjugate vector of a spatial-domain component vector and a frequency-domain component vector, and may be specifically represented as the following formula: $v = \bar{u}_1 \otimes u_2$. Alternatively, a spatial-frequency component vector may be a Kronecker product of a frequency-domain component vector and a spatial-domain component vector, and may be specifically represented as the following formula: $v = u_2 \otimes u_1$. Alternatively, a spatial-frequency component vector may be a Kronecker product of a conjugate vector of a frequency-domain component vector and a spatial-domain component vector, and may be specifically represented as the following formula: $v = \bar{u}_2 \otimes u_1$. Alternatively, a spatial-frequency component vector may be a Kronecker product of a frequency-domain component vector and a conjugate vector of a spatial-domain component vector, and may be specifically represented as the following formula: $v = u_2 \otimes \bar{u}_1$. v is a spatial-frequency component vector. $u_1$ is a spatial-domain component vector, and $u_2$ is a frequency-domain component vector. $\bar{u}_1$ is a conjugate vector of $u_1$, and $\bar{u}_2$ is a conjugate vector of $u_2$. Certainly, this application is not limited thereto.

In a specific implementation process, both the two vectors for constructing the foregoing spatial-frequency component vector may be set to row vectors, or set to column vectors. In this case, the spatial-frequency component vector may be a Kronecker product of the column vectors or a Kronecker product of the row vectors.

For ease of description, the following describes an example in which an spatial-frequency component vector may be a Kronecker product of a spatial-domain component vector and a frequency-domain component vector, or a Kronecker product of a frequency-domain component vector and a spatial-domain component vector. However, a person skilled in the art should understand that a manner of constructing a spatial-frequency component vector is not limited thereto, and another manner may be used to construct the spatial-frequency component vector. For example, but not limited to, the spatial-frequency component vector may be constructed with reference to various manners described above or another manner and by using the spatial-domain component vector and the frequency-domain component vector.

Dimensions of the spatial-frequency component vector are M×N. To be specific, the vector includes M×N elements.

(7) Spatial-Frequency Matrix

The spatial-frequency matrix in a broad sense is a matrix formed by M precoding vectors. Each precoding vector is applied to one of M frequency bands, and the M frequency bands may be frequency bands whose channel information (for example, but not limited to, a precoding vector) needs to be fed back. M≥1, and M is an integer. A precoding vector is usually used to indicate channel information corresponding to a spatial stream in a frequency band. Dimensions of the precoding vector are N, and N may be a quantity of transmit antenna ports of the transmit end device in a polarization direction. N≥2, and N is an integer. The spatial-frequency matrix in a broad sense includes a spatial-frequency matrix in a narrow sense and a spatial-frequency vector.

The spatial-frequency matrix in a narrow sense is an N×M matrix (that is, a matrix with N rows and M columns) or an M×N matrix (that is, a matrix with M rows and N columns) formed by M precoding vectors. The spatial-frequency matrix in a narrow sense may be represented in a form obtained by performing weighted combination on a plurality of spatial-frequency component matrices. It should be noted that, for ease of description, the spatial-frequency matrix below refers to the spatial-frequency matrix in a narrow sense, unless otherwise specified or a meaning to be expressed is obviously contradictory with the spatial-frequency matrix. A unified description is provided herein. Details are not described below again. For the receive end device, the spatial-frequency matrix may be obtained based on a channel matrix. The channel matrix may be a matrix that is used to reflect channel information and that is obtained by the receive end device based on a reference signal sent by the transmit end device. An implementation in which the receive end device obtains the spatial-frequency matrix based on the channel matrix is not limited in this application. For example, refer to Chinese Patent Application No. 201810075250.X, entitled CHANNEL ESTIMATION METHOD AND APPARATUS. After determining a spatial-frequency matrix H, the receive end device may indicate related information (for example, information indicated by indication information below) of the spatial-frequency matrix H to the transmit end device. After receiving the related information, the transmit end device may determine the spatial-frequency matrix H based on a formula $$H = \sum_{w=1}^{W} \hat{h}_w h_w.$$

W is a quantity of spatial-frequency component matrices. $h_w$ is a $w^{th}$ spatial-frequency component matrix. $1 \le w \le W$, $W \ge 2$, and both W and w are integers. $\hat{h}_w$ is a weight of $h_w$. Then, the M precoding vectors are determined based on the determined spatial-frequency matrix H. Each column of the spatial-frequency matrix H is a precoding vector, to-be-sent data is precoded based on the M precoding vectors, and then the precoded data is sent.

The spatial-frequency vector is an M×N-dimensional vector (that is, including M×N elements). That is, the spatial-frequency vector may be a spatial-frequency matrix in a broad sense with one column. The spatial-frequency vector may be represented in a form obtained by performing weighted combination on a plurality of spatial-frequency component vectors. For the receive end device, the spatial-frequency vector may be obtained based a channel matrix. An implementation in which the receive end device obtains the spatial-frequency vector based on the channel matrix is not limited in this application. For example, refer to Chinese Patent Application No. 201810075250.X, entitled CHANNEL ESTIMATION METHOD AND APPARATUS. After determining a spatial-frequency vector V, the receive end device may indicate related information of the spatial-frequency vector V to the transmit end device. After receiving the related information, the transmit end device may determine the spatial-frequency vector V based on a formula $$V = \sum_{z=1}^{Z} \hat{g}_z v_z.$$

Z is a quantity of spatial-frequency component vectors. $v_z$ is a $z^{th}$ spatial-frequency component vector. $1 \leq z \leq Z$, $Z \geq 2$, and both Z and z are integers. $\hat{g}_z$ is a weight of $v_z$. Then, the M precoding vectors are determined based on the determined spatial-frequency vector V, and to-be-sent data is precoded based on the M precoding vectors. For example, precoding is performed by using the foregoing M precoding vectors; or the foregoing M precoding vectors are adjusted, and then precoding is performed by using the adjusted M precoding vectors. Then, the precoded data is sent.

It may be understood that, if the spatial-frequency vector is a column vector, the spatial-frequency component vector is a column vector. If the spatial-frequency vector is a row vector, the spatial-frequency component vector is a row vector.

It should be noted that, in the descriptions of this specification, unless otherwise specified, or if there is no conflict with an actual function or internal logic of a vector in related descriptions, all vectors described in this specification may be understood as vectors in a same form, for example, row vectors or column vectors.

In addition, the term "a plurality of" in this application means two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. When the character "/" is used in a formula, the character usually indicates a "division" relationship between the associated objects. For example, a formula A/B indicates that A is divided by B. In this application, the terms "first", "second", and so on are intended to distinguish between different objects but do not indicate a particular order of the objects.

It should be noted that, for ease of description, the following describes an example in which any vector (for example, a spatial-domain component vector, a frequency-domain component vector, a spatial-frequency vector, or a precoding vector) is a column vector. A unified description is provided herein. Details are not described below again. It may be understood that during specific implementation, any vector may alternatively be a row vector. A person skilled in the art should be able to reasonably deduce that any vector is a row vector without creative efforts based on the technical solutions provided in this application. A corresponding technical solution is not described again in this specification. Further, in a specific implementation process, forms of a vector and a matrix used in this specification may be adjusted based on a specific requirement. For example, the vector and the matrix are transposed, or the vector and/or the matrix is represented in a conjugate form of the vector and/or the matrix, or a combination of the foregoing forms and another form. Therefore, all the foregoing speculations and adjustments should be understood as falling within the scope of the embodiments of this application.

The following describes the technical solutions provided in the embodiments of this application with reference to the accompanying drawings.

Figure 3:
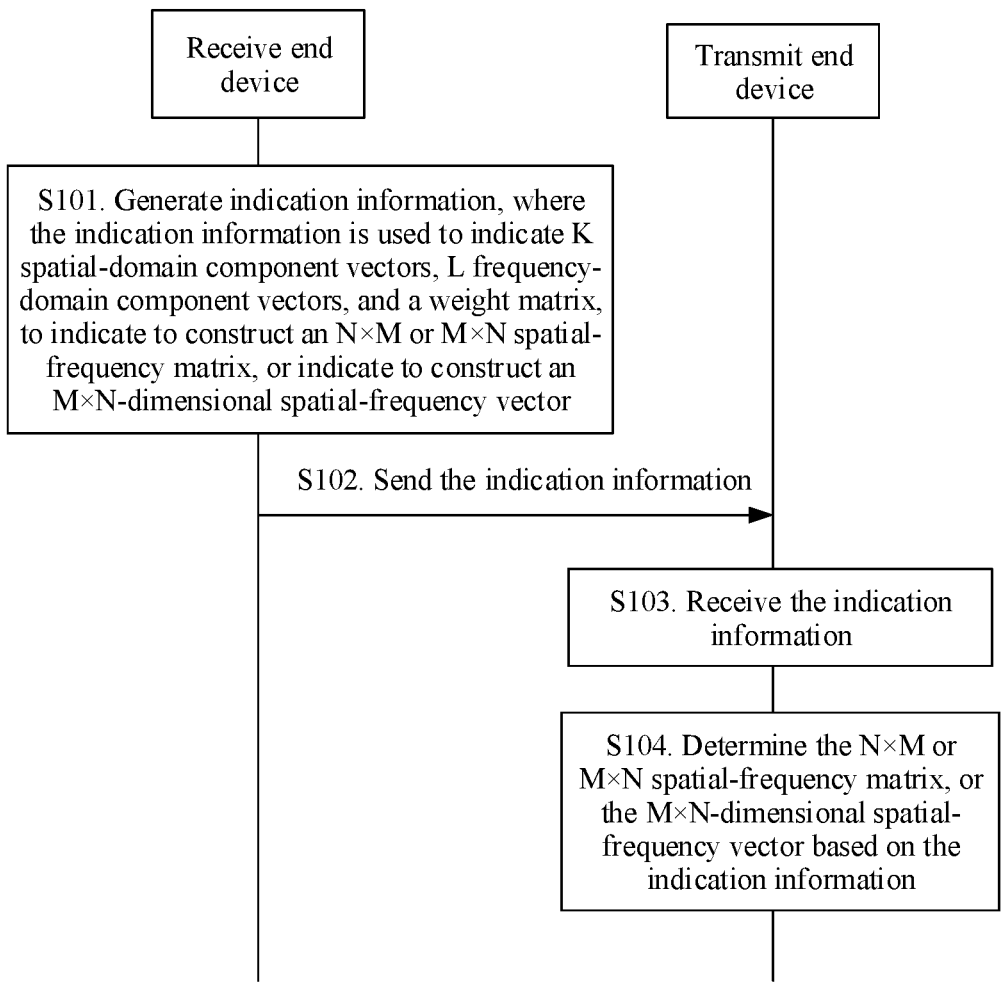
FIG. 3 is a schematic flowchart of a channel estimation method according to an embodiment of this application.

FIG. 3 is a schematic interaction diagram of a channel estimation method according to an embodiment of this application. The method shown in FIG. 3 may include the following steps.

S101: A receive end device generates indication information.

The indication information is used to indicate K spatial-domain component vectors, L frequency-domain component vectors, and a weight matrix, to indicate to construct an N×M or M×N spatial-frequency matrix, where the spatial-frequency matrix includes M N-dimensional precoding vectors, each precoding vector is applied to one of M frequency bands, the spatial-frequency matrix is generated by performing weighted combination on a plurality of spatial-frequency component matrices, and each of the plurality of spatial-frequency component matrices is constructed based on two vectors.

Alternatively, the indication information is used to indicate K spatial-domain component vectors, L frequency-domain component vectors, and a weight matrix, to indicate to construct an M×N-dimensional spatial-frequency vector, where the spatial-frequency vector includes M N-dimensional precoding vectors, each precoding vector is applied to one of M frequency bands, the spatial-frequency vector is generated by performing weighted combination on a plurality of spatial-frequency component vectors, and each of the plurality of spatial-frequency component vectors is constructed based on two vectors.

In a solution in which the indication information is used to indicate to construct the foregoing spatial-frequency matrix or spatial-frequency vector, one of the two vectors is constructed based on one of the K spatial-domain component vectors, and the other one is constructed based on one of the L M-dimensional frequency-domain component vectors. For a specific example, refer to the foregoing description. In addition, the weight matrix is a matrix formed by weights of the plurality of spatial-frequency component matrices. $M \geq 1$, $N \geq 2$, $K \geq 1$, $L \geq 1$, and M, N, K, and L are all integers. The spatial-domain component vector is N-dimensional, and the frequency-domain component vector is M-dimensional.

It may be understood that, formally, the M×N-dimensional spatial-frequency vector may be equivalent to an M×N-dimensional row vector obtained by expanding the foregoing N×M spatial-frequency matrix row by row, may be equivalent to an M×N-dimensional column vector obtained by expanding the foregoing N×M spatial-frequency matrix column by column, may be equivalent to an M×N-dimensional column vector obtained by expanding the foregoing M×N spatial-frequency matrix column by column, or may be equivalent to an M×N-dimensional row vector obtained by expanding the foregoing M×N spatial-frequency matrix row by row. Certainly, this application is not limited thereto. An example in which the indication information is used to indicate the K spatial-domain component vectors, the L frequency-domain component vectors, and the weight matrix, to indicate to construct the N×M or M×N spatial-frequency matrix is used below for description.

The M N-dimensional precoding vectors may be precoding vectors based on which a single spatial stream is transmitted in each of the M frequency bands. M may be less than or equal to a quantity of frequency bands corresponding to channel information that a transmit end device indicates the receive end device to feed back.

In a specific implementation process, one or more spatial-frequency matrices may be designed according to an actual requirement when a single spatial stream is transmitted in each frequency band, provided that a sum of quantities of column vectors in the one or more spatial-frequency matrices is equal to the quantity of frequency bands corresponding to the channel information that the transmit end device indicates the receive end device to feed back. For example, for a single spatial stream, precoding vectors corresponding to several consecutive frequency bands may form one spatial-frequency matrix. For example, if system bandwidth is divided into frequency bands 1 to 10, and the transmit end device indicates the receive end device to feed back channel information for the frequency bands 1 to 5, for a single spatial stream, the M precoding vectors may be precoding vectors corresponding to the frequency bands 1 to 5. In this case, M=5. For example, if system bandwidth is divided into frequency bands 1 to 10, and the transmit end device indicates the receive end device to feed back channel information for the frequency bands 1, 2, 3, 8, and 9, for any spatial stream, precoding vectors corresponding to the frequency bands 1, 2, and 3 may form an N×3 spatial-frequency matrix or a 3×N spatial-frequency matrix, and precoding vectors corresponding to the frequency bands 8 and 9 may form an N×2 spatial-frequency matrix or a 2×N spatial-frequency matrix. Certainly, precoding vectors corresponding to the frequency bands 1, 2, 3, 8, and 9 may also form an N×5 spatial-frequency matrix or a 5×N spatial-frequency matrix.

One of the K spatial-domain component vectors and one of the L frequency-domain component vectors form a vector group, and K×L vector groups may be obtained by traversing the K spatial-domain component vectors and the L frequency-domain component vectors. Assuming that each vector group constructs one spatial-frequency component matrix, the K×L vector groups may form K×L spatial-frequency component matrices. Because each spatial-frequency component matrix corresponds to one weight, the weight matrix may include K×L elements. It may be understood that a quantity of spatial-frequency component matrices for constructing a spatial-frequency matrix may alternatively be less than K×L. In this case, it may be considered that a weight of a spatial-frequency component matrix or weights of some spatial-frequency component matrices formed by the K spatial-domain component vectors and the L frequency-domain component vectors are 0.

When the spatial-frequency matrix is an N×M matrix, the weight matrix is a K×L matrix. When the spatial-frequency matrix is an M×N matrix, the weight matrix is an L×K matrix. The following describes this by using a formula:

Assuming that the spatial-frequency matrix is an N×M matrix, a spatial-frequency matrix H may be represented as:

$$H = \sum_{k=1}^{K}\sum_{l=1}^{L} \hat{h}_{k,l} u_{1,k} u_{2,l}^* = U_1 \hat{H}_{K,L} U_2^*$$

$\hat{h}_{k,l}$ is a weight of a $(k,l)^{th}$ spatial-frequency component matrix. The $(k, l)^{th}$ spatial-frequency component matrix is a matrix obtained by multiplying $u_{1,k}$ by $u_{2,l}^*$. $u_{1,k}$ is a $k^{th}$ spatial-domain component vector in the K spatial-domain component vectors, $u_{2,l}$ is an $l^{th}$ frequency-domain component vector in the L frequency-domain component vectors, and $u_{2,l}^*$ is a conjugate transpose vector of $u_{2,l}$. $1 \leq k \leq K$, and $1 \leq l \leq L$. $U_1$ is an N×K matrix formed by the K spatial-domain component vectors. $U_2$ is an M×L matrix formed by the L frequency-domain component vectors. $U_2^*$ is a conjugate transpose matrix of $U_2$, and is an L×M matrix. $\hat{H}_{K,L}$ is a K×L matrix formed by weights of K×L spatial-frequency component matrices, and $\hat{h}_{k,l}$ is an element in a $k^{th}$ row and an $l^{th}$ column.

Assuming that the spatial-frequency matrix is an M×N matrix, a spatial-frequency matrix H may be represented as:

$$H = \sum_{k=1}^{K}\sum_{l=1}^{L} \hat{h}_{l,k} u_{2,l} u_{1,k}^* = U_2 \hat{H}_{L,K} U_1^*$$

$\hat{h}_{l,k}$ is a weight of an $(l,k)^{th}$ spatial-frequency component matrix. $\hat{H}_{L,K}$ is an L×K matrix formed by weights of K×L spatial-frequency component matrices, and $\hat{h}_{l,k}$ is an element in an $l^{th}$ row and a $k^{th}$ column in $\hat{H}_{L,K}$. For meanings of other parameters such as $u_{1,k}$, $u_{2,l}^*$, $U_1$, and $U_2^*$, refer to the foregoing description.

In this application, the spatial-domain component vector may be selected from a spatial-domain component vector set, and therefore, $u_{1,k}$ may be represented as $u_{1,k} \in \{b_{1,x}\}_{x=1, 2, \ldots X}$. $\{b_{1,x}\}_{x=1, 2, \ldots X}$ is a set formed by some or all spatial-domain component vectors in the spatial-domain component vector set. $\{b_{1,x}\}_{x=1, 2, \ldots X}$ includes a total of X spatial-domain component vectors, and $b_{1,x}$ is an $x^{th}$ spatial-domain component vector in $\{b_{1,x}\}_{x=1, 2, \ldots X}$. $1 \leq x \leq X$, and both x and X are integers. The frequency-domain component vector may be selected from a frequency-domain component vector set, and therefore, $u_{2,l}$ may be represented as: $u_{2,l} \in \{f_{2,y}\}_{y=1, 2, \ldots Y}$. $\{f_{2,y}\}_{y=1, 2, \ldots Y}$ is a set formed by some or all frequency-domain component vectors in the frequency-domain component vector set. $\{f_{2,y}\}_{y=1, 2, \ldots Y}$ includes a total of Y frequency-domain component vectors, and $f_{2,y}$ is a $y^{th}$ frequency-domain component vector in $\{f_{2,y}\}_{y=1, 2, \ldots Y}$. $1 \leq y \leq Y$, and both y and Y are integers. S102: The receive end device sends the indication information. Information indicated by the indication information is referred to as to-be-indicated information. In a specific implementation process, the to-be-indicated information is indicated in a plurality of manners, for example but not limited to, a manner in which the to-be-indicated information, for example, the to-be-indicated information itself or an index of the to-be-indicated information may be directly indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or agreed on in advance. For example, specific information may be indicated based on an arrangement sequence of pieces of information that is agreed on in advance (for example, stipulated in a protocol), to reduce indication overheads to some extent. In addition, a common part of the pieces of information may be further identified and indicated in a unified manner, to reduce indication overheads caused by separately indicating same information. For example, a person skilled in the art should understand that a precoding matrix is composed by precoding vectors, and the precoding vectors in the precoding matrix may have a same part in terms of composition or another attribute.

In addition, a specific indication manner may alternatively be various existing indication manners, which are, for example but not limited to, the foregoing indication manners and various combinations thereof. For specific details of the various indication manners, refer to the prior art. Details are not described in this specification. It can be learned from the foregoing description that, for example, when a plurality of pieces of information of a same type need to be indicated, indication manners of different information may be different. In a specific implementation process, a required indication manner may be selected based on a specific requirement. The selected indication manner is not limited in this embodiment of this application. In this way, the indication manner in this embodiment of this application should be understood as covering various methods that can enable a to-be-indicated party to learn of the to-be-indicated information.

In addition, the to-be-indicated information may have another equivalent form. For example, a row vector may be represented as a column vector, a matrix may be represented by using a transposed matrix of the matrix, and a Kronecker product of two vectors may be represented in a form such as a product of a vector and a transposed vector of the other vector. The technical solution provided in this embodiment of this application should be understood as covering various forms. For example, some or all of characteristics in this embodiment of this application should be understood as covering various representation forms of the characteristics. For example, a spatial-frequency component matrix should be understood as covering various representation forms that can represent the spatial-frequency component matrix, for example but not limited to, a Kronecker product of a spatial-domain frequency component vector and a frequency-domain component vector, a product of one of a spatial-domain component vector and a frequency-domain component vector and a conjugate transpose vector of the other one, and an array that includes the foregoing Kronecker products and elements in product results.

The to-be-indicated information may be sent as a whole, or may be divided into a plurality of pieces of sub-information and separately sent. In addition, sending periods and/or sending occasions of these pieces of sub-information may be the same or may be different. A specific sending method is not limited in this application. The sending periods and/or the sending occasions of these pieces of sub-information may be predefined, for example, predefined according to a protocol, or may be configured by the transmit end device by sending configuration information to the receive end device. The configuration information may include, for example but not limited to, one of RRC signaling, MAC signaling, and DCI, or a combination of at least two of the RRC signaling, the MAC signaling, and the DCI.

The indication information may be a precoding matrix indicator (precoding matrix indicator, PMI), or may be other indication information. The indication information may be carried in one or more messages in the prior art and sent by the receive end device to the transmit end device, or may be carried in one or more messages newly designed in this application and sent by the receive end device to the transmit end device.

In addition, it should be understood that the method shown in FIG. 3 is described based on a case in which a single spatial stream (for example, a data layer obtained through layer mapping) is sent in each frequency band in a single polarization direction. However, a person skilled in the art should understand that the technical solution provided in this embodiment of this application is not limited thereto, and the technical solution provided in this embodiment of this application may be extended to a case in which a plurality of spatial streams are sent in each frequency band in a plurality of polarization directions. It is not difficult to understand that in this case, the indication information includes a related indication of a precoding vector of each of the plurality of spatial streams in each of the plurality of polarization directions in each of the M frequency bands. It can be learned that the indication information mentioned in this embodiment of this application does not exclude the following case: When the M N-dimensional precoding vectors are indicated as described in S101, one or more other groups of M N-dimensional precoding vectors are further indicated, and these groups of M N-dimensional precoding vectors may correspond to different polarization directions, different spatial streams, or the like. In addition, if the indication information includes the related indication of the precoding vector of each of the plurality of spatial streams in each of the plurality of polarization directions in each of the M frequency bands, it should be understood that a specific indication method may be set based on a specific requirement. For example, refer to the various indication manners described above.

Simply, the spatial-frequency component matrix provided in this embodiment of this application is a combination of a basic spatial-domain characteristic and a basic frequency-domain characteristic, so that a basic spatial-frequency characteristic is obtained. The basic spatial-domain characteristic may be understood as describing a basic spatial direction, and the basic frequency-domain characteristic may be understood as a change mode of a channel in a plurality of frequency bands. In this case, the spatial-frequency component matrix may be understood as describing a basic spatial-frequency characteristic. Based on this, more spatial-frequency characteristics can be described by performing weighted summation on a plurality of spatial-frequency component matrices.

S103: The transmit end device receives the indication information.

S104: The transmit end device determines the N×M or M×N spatial-frequency matrix, or the M×N-dimensional spatial-frequency vector based on the indication information.

How to determine the N×M or M×N spatial-frequency matrix or the M×N-dimensional spatial-frequency vector is not limited in this embodiment of this application. For example, the N×M or M×N spatial-frequency matrix or the M×N-dimensional spatial-frequency vector may be determined by determining the K N-dimensional spatial-domain component vectors, the L M-dimensional frequency-domain component vectors, and the weight matrix. For example, the N×M or M×N spatial-frequency matrix or the M×N-dimensional spatial-frequency vector may be determined by determining the M N-dimensional precoding vectors. For example, the N×M or M×N spatial-frequency matrix or the M×N-dimensional spatial-frequency vector may be determined based on an amplitude matrix and a phase matrix that are obtained by determining the K N-dimensional spatial-domain component vectors, the L M-dimensional frequency-domain component vectors, and the weight matrix. Certainly, this application is not limited thereto.

In the foregoing technical solution provided in this embodiment of this application, the M N-dimensional precoding vectors may form a spatial-frequency matrix and the spatial-frequency matrix is generated by performing weighted combination on a plurality of spatial-frequency component matrices, so that a condition may be created for reducing indication overheads of the precoding vectors. In addition, in the technical solution provided in this embodiment of this application, the spatial-frequency matrix is specifically indicated by indicating "the K N-dimensional spatial-domain component vectors, the L M-dimensional frequency-domain component vectors, and the weight matrix" that are used to construct the plurality of spatial-frequency component matrices. Therefore, compared with the prior-art technical solution of independently indicating a precoding vector corresponding to each frequency band, the technical solution provided in this embodiment of this application helps reduce the indication overheads. For example, if K<N and/or L<M, because related information of the precoding vector corresponding to each frequency band is independently indicated in the prior art, related information for constructing an N×M (or M×N) matrix needs to be indicated. In this example, it is necessary to indicate only related information for constructing a K×L (or an L×K) matrix. Therefore, the indication overheads can be reduced.

It may be understood that each element in the weight matrix is a complex number. In this application, a matrix formed by amplitudes of elements in the weight matrix is referred to as an amplitude matrix, and a matrix formed by phases of the elements in the weight matrix is referred to as a phase matrix. The indication information may indicate the weight matrix by indicating the amplitude matrix and the phase matrix.

For example, an amplitude of the element $\hat{h}_{k,l}$ in the $k^{th}$ row and the $l^{th}$ column in the weight matrix $\hat{H}_{K,L}$ is an element $a_{k,l}$ in a $k^{th}$ row and an $l^{th}$ column in an amplitude matrix $\hat{A}_{K,L}$, and a phase of $\hat{h}_{k,l}$ is an element $p_{k,l}$ in a $k^{th}$ row and an $l^{th}$ column in a phase matrix $\hat{P}_{K,L}$. Alternatively, an amplitude of the element $\hat{h}_{l,k}$ in the $l^{th}$ row and the $k^{th}$ column in the weight matrix $\hat{H}_{L,K}$ is an element $a_{l,k}$ in an $l^{th}$ row and a $k^{th}$ column in an amplitude matrix $\hat{A}_{L,K}$, and a phase of $\hat{h}_{l,k}$ is an element $p_{l,k}$ in an $l^{th}$ row and a $k^{th}$ column in a phase matrix $\hat{P}_{L,K}$. Based on this, all specific examples below are described.

For example, the elements in the weight matrix $\hat{H}_{K,L}$ may be first normalized relative to a maximum element (which is specifically an element with a maximum amplitude or an element with a maximum modulus) in the weight matrix, and then an amplitude of an element in the $k^{th}$ row and the $l^{th}$ column in the normalized weight matrix is used as $a_{k,l}$, and a phase of the element is used as $p_{k,l}$. Alternatively, an amplitude of an element in the $l^{th}$ row and the $k^{th}$ column in the normalized weight matrix is used as $a_{l,k}$, and a phase of the element is used as $p_{l,k}$. It may be understood that, based on this example, before unified quantization or first-level quantization below is performed, normalization may not be performed. A unified description is provided herein, and details are not described again below. In addition, in this example, after the maximum element in the weight matrix is normalized, an obtained phase is 0 and an obtained amplitude is 1; in this case, the receive end device may not report the amplitude and the phase of the maximum element in the weight matrix.

It may be understood that the amplitude matrix indicated by the indication information is a quantized amplitude matrix, and the phase matrix indicated by the indication information is a quantized phase matrix. Unless otherwise limited, amplitude matrices below are all quantized amplitude matrices, and phase matrices below are all quantized phase matrices. A unified description is provided herein. Details are not described below again.

The following describes the amplitude matrix.

Optionally, the receive end device may quantize elements in a to-be-quantized amplitude matrix in any one of Manner 1 to Manner 3 below, to obtain a quantized amplitude matrix $\hat{A}_{K,L}$ or $\hat{A}_{L,K}$.

Manner 1: The receive end device may quantize the to-be-quantized amplitude matrix in a unified manner. Generally, normalization may be first performed before quantization. Specifically, the receive end device may first normalize the elements in the to-be-quantized amplitude matrix relative to a maximum element in the matrix, to obtain a normalized amplitude matrix, where after the maximum element in the to-be-quantized amplitude matrix is normalized, an obtained value is 1; and then quantize the elements in the normalized amplitude matrix, to obtain a quantized amplitude matrix.

Example 1: It is assumed that the to-be-quantized amplitude matrix is a 4×4 matrix, and is represented as $$\hat{A}'_{4,4} = \begin{bmatrix} a'_{1,1} & a'_{1,2} & a'_{1,3} & a'_{1,4} \\ a'_{2,1} & a'_{2,2} & a'_{2,3} & a'_{2,4} \\ a'_{3,1} & a'_{3,2} & a'_{3,3} & a'_{3,4} \\ a'_{4,1} & a'_{4,2} & a'_{4,3} & a'_{4,4} \end{bmatrix} \cdot \hat{A}'_{4,4}$$

is the to-be-quantized amplitude matrix, $a_{c,d}'$ is an element in a $c^{th}$ row and a $d^{th}$ column in $\hat{A}_{4,4}'$, $1 \leq c \leq 4$, $1 \leq d \leq 4$, and both c and d are integers. In this case, if a maximum element in $\hat{A}_{4,4}'$ is $a_{2,3}'$, the receive end device may use $a_{2,3}'$ as a normalization reference to normalize elements in $\hat{A}_{4,4}'$. After $a_{2,3}'$ is normalized, 1 is obtained, and after another element is normalized, an obtained value is less than or equal to 1. Then, normalized elements are quantized, to obtain quantized values of the normalized elements, that is, obtain normalization coefficients corresponding to the normalized elements. The normalization coefficients corresponding to the normalized elements form the following amplitude matrix $$\hat{A}_{4,4} = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \end{bmatrix} = \begin{bmatrix} \left(\frac{a'_{1,1}}{a'_{2,3}}\right)^2 & \left(\frac{a'_{1,2}}{a'_{2,3}}\right)^2 & \left(\frac{a'_{1,3}}{a'_{2,3}}\right)^2 & \left(\frac{a'_{1,4}}{a'_{2,3}}\right)^2 \\ \left(\frac{a'_{2,1}}{a'_{2,3}}\right)^2 & \left(\frac{a'_{2,2}}{a'_{2,3}}\right)^2 & \%_0 & \left(\frac{a'_{2,4}}{a'_{2,3}}\right)^2 \\ \left(\frac{a'_{3,1}}{a'_{2,3}}\right)^2 & \left(\frac{a'_{3,2}}{a'_{2,3}}\right)^2 & \left(\frac{a'_{3,3}}{a'_{2,3}}\right)^2 & \left(\frac{a'_{3,4}}{a'_{2,3}}\right)^2 \\ \left(\frac{a'_{4,1}}{a'_{2,3}}\right)^2 & \left(\frac{a'_{4,2}}{a'_{2,3}}\right)^2 & \left(\frac{a'_{4,3}}{a'_{2,3}}\right)^2 & \left(\frac{a'_{4,4}}{a'_{2,3}}\right)^2 \end{bmatrix} \cdot \hat{A}_{4,4}$$

is a quantized amplitude matrix, $$\frac{a'_{1,1}}{a'_{2,3}}$$

is a value obtained after $a_{1,1}'$ is normalized relative to $a_{2,3}'$, and $$\left(\frac{a'_{1,1}}{a'_{2,3}}\right)^2$$

is a value obtained after $$\frac{a'_{1,1}}{a'_{2,3}}$$

is quantized. Explanations of other elements are similar to this, and details are not described herein again. A normalization coefficient (that is, $\sqrt{1}$) obtained after 1 is quantized may be 1, and a normalization coefficient obtained after another element is quantized is less than or equal to 1.

Based on Manner 1, the indication information may indicate the amplitude matrix (for example, $\hat{A}_{4,4}$) by indicating a quantized value of each element in the amplitude matrix relative to the maximum element in the amplitude matrix. Specifically, Manner 1 may be reflected as either of Manner 1A and Manner 1B below:

Manner 1A: The indication information may carry an index of the following information: the quantized value of each element in the amplitude matrix relative to the maximum element in the amplitude matrix.

Based on this, the transmit end device may obtain, based on a correspondence between a quantized value and an index of the quantized value, and the index carried in the indication information, a quantized value corresponding to the index carried in the indication information. Then, the amplitude matrix is constructed based on the quantized value of each element in the amplitude matrix relative to the maximum element in the amplitude matrix.

It should be noted that "a quantized value of an element relative to another element" described in this application is a quantized value obtained by first normalizing the element relative to the another element and then quantizing the normalized value. A unified description is provided herein. Details are not described below again. In addition, it should be noted that, to reduce signaling overheads, indexes of a plurality of quantized values carried in the indication information are usually arranged in a specific sequence. Certainly, this application is not limited thereto. A unified description is provided herein. Details are not described below again. For example, based on Manner 1A, the receive end device may include, in the indication information, indexes of elements obtained after the amplitude matrix is expanded row by row or column by column. A specific manner (for example, the foregoing row-by-row or column-by-column manner) of carrying the indexes of the elements in the amplitude matrix may be preset, or may be configured by the transmit end device for the receive end device.

Based on Example 1, in Manner 1A, the indication information may carry indexes of the elements in the amplitude matrix $\hat{A}_{4,4}$. For example, the indexes of the elements obtained after the amplitude matrix $\hat{A}_{4,4}$ is expanded row by row or column by column are carried in the indication information. The transmit end device may obtain the amplitude matrix $\hat{A}_{4,4}$ based on content carried in the indication information and a preset manner (for example, the foregoing row-by-row or column-by-column manner).

Manner 1B: The indication information may carry indexes of the following information: a location of the maximum element in the amplitude matrix in the amplitude matrix, and a quantized value of an element in the amplitude matrix other than the maximum element relative to the maximum element in the amplitude matrix. For example, the index of the location of the maximum element in the amplitude matrix in the amplitude matrix may be a one-dimensional number of the maximum element in the amplitude matrix in the amplitude matrix. For example, assuming that the amplitude matrix is a K×L matrix, K×L elements in the amplitude matrix may be uniformly numbered 1 to K×L, and the numbers are one-dimensional numbers. For another example, the index of the location of the maximum element in the amplitude matrix in the amplitude matrix may be a two-dimensional number of the maximum element in the amplitude matrix, that is, numbers of a row and a column in which the maximum element is located.

Based on this, the transmit end device may obtain, based on a correspondence between a quantized value and an index of the quantized value, and the index carried in the indication information, a quantized value corresponding to the index carried in the indication information. Then, the transmit end device obtains the quantized value of each element in the amplitude matrix relative to the maximum element in the amplitude matrix based on the location of the maximum element in the amplitude matrix in the amplitude matrix and the quantized value of the element in the amplitude matrix other than the maximum element relative to the maximum element in the amplitude matrix. Finally, the transmit end device obtains the amplitude matrix based on the related description in Manner 1A.

Based on Example 1, in Manner 1B, the indication information may specifically carry indexes of the following information: a location (that is, the second row and the third column) of $a_{2,3}$ in the amplitude matrix $\hat{A}_{4,4}$ and $a_{c,d}$. $1 \leq c \leq 4$, $1 \leq d \leq 4$ both c and d are integers, and in addition, c=2 and d=3 do not exist at the same time. For example, the receive end device may indicate the location of $a_{2,3}$ in the amplitude matrix $\hat{A}_{4,4}$ by using a number (2, 3) carried in the indication information. The transmit end device may obtain a location of each element in the amplitude matrix $\hat{A}_{4,4}$ based on the location of $a_{2,3}$ in the amplitude matrix $\hat{A}_{4,4}$, and then may obtain the amplitude matrix based on the related description in Manner 1A.

A quantization scheme used in unified quantization is not limited in this embodiment of this application. An attribute of the quantization scheme may include a quantity of quantization bits and a quantization algorithm. The quantization algorithm may include, for example but not limited to: linear value quantization or logarithmic value quantization. Certainly, in addition to such a non-linear quantization algorithm as the logarithmic value quantization, the quantization algorithm may alternatively be another non-linear value quantization algorithm. For example, if the quantity of quantization bits is 3 and the quantization algorithm is the logarithmic value quantization, the quantization scheme may be as follows: Indexes 000 to 111 of quantized values respectively correspond to normalization coefficients 0, $\sqrt{1/64}$, $\sqrt{1/32}$, $\sqrt{1/16}$, $\sqrt{1/8}$, $\sqrt{1/4}$, $\sqrt{1/2}$, and 1. For example, if the quantity of quantization bits is 3 and the quantization algorithm is the linear value quantization algorithm, the quantization scheme may be as follows: Indexes 000 to 111 of quantized values respectively correspond to normalization coefficients 1/8, 1/4, 3/8, 1/2, 5/8, 3/4, 7/8 and 1. In addition, the quantization scheme used in unified quantization may be preset, for example, preset in a protocol, or may be configured by the transmit end device for the receive end device. For example, the transmit end device may perform configuration by using at least one of radio resource control (radio resource control, RRC) signaling, medium access control (medium access control, MAC) signaling, and downlink control information (downlink control information, DCI).

Manner 2: The receive end device may perform level-based quantization on the amplitude matrix. Specifically, first, a maximum element in each vector in a to-be-quantized amplitude matrix is quantized (that is, first-level quantization). Then, for each vector, each element in the vector is quantized (that is, second-level quantization).

Each vector is each row vector or each column vector in the to-be-quantized amplitude matrix. Optionally, normalization may be first performed before each level of quantization. A row vector in a matrix is a vector formed by a row of elements in the matrix. A column vector in a matrix is a vector formed by a column of elements in the matrix. Meanings of "row vector" and "row" below are the same, and may be used interchangeably. For example, the first row vector is equivalent to the first row. Meanings of "column vector" and "column" are the same, and can be used interchangeably. A unified description is provided herein. Details are not described below again.

Optionally, a quantization scheme used in the first-level quantization may be the same as or different from a quantization scheme used in the second-level quantization. Different quantization schemes may be reflected as, for example but not limited to: different quantities of quantization bits and/or different quantization algorithms. Both the quantization scheme used in the first-level quantization and the quantization scheme used in the second-level quantization may be preset, for example, preset in a protocol, or may be configured by the transmit end device for the receive end device. For example, the transmit end device may perform configuration by using at least one of RRC signaling, MAC signaling, and DCI. For example, different quantization schemes are specifically reflected as different quantities of quantization bits. The transmit end device may configure a plurality of quantities of quantization bits for the receive end device (for example, by using RRC signaling, MAC signaling, or DCI), and then the receive end device determines to select one of the plurality of quantities of quantization bits to perform the first-level quantization or the second-level quantization. In this case, the receive end device may further indicate the selected quantity of quantization bits to the transmit end device. Alternatively, the transmit end device may configure a plurality of quantities of quantization bits for the receive end device by using RRC signaling, and then configure one of the plurality of quantities of quantization bits for the receive end device by using MAC signaling or DCI.

Optionally, during the second-level quantization, when elements in different vectors are quantized, used quantization schemes may be the same or may be different. For example, a vector in which a maximum element is relatively large in the amplitude matrix corresponds to a relatively large quantity of quantization bits, and a vector in which a maximum element is relatively small in the amplitude matrix corresponds to a relatively small quantity of quantization bits. Usually, compared with the vector in which the maximum element is relatively small in the amplitude matrix, the vector in which the maximum element is relatively large in the amplitude matrix has greater impact on precision of a precoding vector. Therefore, this helps improve quantization precision of a more important element and reduce quantization bit overheads of a less important element, to improve overall performance.

In Manner 2, the quantized value of each element in the amplitude matrix is a product of a quantized value of the element relative to a maximum element in the vector in which the element is located and a quantized value of the maximum element relative to a maximum element in the amplitude matrix.

Example 2: Assuming that a to-be-quantized amplitude matrix is the foregoing matrix $\overset{\backprime}{A}_{4,4}'$, and a maximum element in $\overset{\backprime}{A}_{4,4}'$ is $a_{2,3}'$, if maximum elements in the first row to the fourth row are respectively $a_{1,1}'$, $a_{2,3}'$, $a_{3,2}'$, and $a_{4,1}'$, during the first-level quantization, the receive end device may normalize $a_{1,1}'$, $a_{2,3}'$, $a_{3,2}'$, and $a_{4,1}'$ separately by using $a_{2,3}'$ as a normalization reference, to obtain $$\left(\frac{a_{1,1}'}{a_{2,3}'}\right)^2, 1, \left(\frac{a_{3,2}'}{a_{2,3}'}\right)^2, \text{ and } \left(\frac{a_{4,1}'}{a_{2,3}'}\right)^2;$$

and then, quantize $$\left(\frac{a_{1,1}'}{a_{2,3}'}\right)^2, 1, \left(\frac{a_{3,2}'}{a_{2,3}'}\right)^2, \text{ and } \left(\frac{a_{4,1}'}{a_{2,3}'}\right)^2$$

separately, to obtain $$\widehat{\left(\frac{a_{1,1}'}{a_{2,3}'}\right)^2}, \widehat{1}, \widehat{\left(\frac{a_{3,2}'}{a_{2,3}'}\right)^2}, \text{ and } \widehat{\left(\frac{a_{4,1}'}{a_{2,3}'}\right)^2}.$$

During the second-level quantization, for each row in $\overset{\backprime}{A}_{4,4}'$, the receive end device may normalize each element in the row, and then quantize each normalized element in the row. An amplitude matrix obtained after the first-level quantization and the second-level quantization may be:

$$\overset{\backprime}{A}_{4,4} = \begin{bmatrix} a_{1,1} & a_{1,2} & a_{1,3} & a_{1,4} \\ a_{2,1} & a_{2,2} & a_{2,3} & a_{2,4} \\ a_{3,1} & a_{3,2} & a_{3,3} & a_{3,4} \\ a_{4,1} & a_{4,2} & a_{4,3} & a_{4,4} \end{bmatrix} =$$

$$\begin{bmatrix} \widehat{\left(\frac{a_{1,1}'}{a_{2,3}'}\right)^2} \times \widehat{1} & \widehat{\left(\frac{a_{1,1}'}{a_{2,3}'}\right)^2} \times \widehat{\left(\frac{a_{1,2}'}{a_{1,1}'}\right)^2} & \widehat{\left(\frac{a_{1,1}'}{a_{2,3}'}\right)^2} \times \widehat{\left(\frac{a_{1,3}'}{a_{1,1}'}\right)^2} & \widehat{\left(\frac{a_{1,1}'}{a_{2,3}'}\right)^2} \times \widehat{\left(\frac{a_{1,4}'}{a_{1,1}'}\right)^2} \\ \widehat{1} \times \widehat{\left(\frac{a_{2,1}'}{a_{2,3}'}\right)^2} & \widehat{1} \times \widehat{\left(\frac{a_{2,2}'}{a_{2,3}'}\right)^2} & \widehat{1} \times \widehat{1} & \widehat{1} \times \widehat{\left(\frac{a_{2,4}'}{a_{2,3}'}\right)^2} \\ \widehat{\left(\frac{a_{3,2}'}{a_{2,3}'}\right)^2} \times \widehat{\left(\frac{a_{3,1}'}{a_{3,2}'}\right)^2} & \widehat{\left(\frac{a_{3,2}'}{a_{2,3}'}\right)^2} \times \widehat{1} & \widehat{\left(\frac{a_{3,2}'}{a_{2,3}'}\right)^2} \times \widehat{\left(\frac{a_{3,3}'}{a_{3,2}'}\right)^2} & \widehat{\left(\frac{a_{3,2}'}{a_{2,3}'}\right)^2} \times \widehat{\left(\frac{a_{3,4}'}{a_{3,2}'}\right)^2} \\ \widehat{\left(\frac{a_{4,1}'}{a_{2,3}'}\right)^2} \times \widehat{1} & \widehat{\left(\frac{a_{4,1}'}{a_{2,3}'}\right)^2} \times \widehat{\left(\frac{a_{4,2}'}{a_{4,1}'}\right)^2} & \widehat{\left(\frac{a_{4,1}'}{a_{2,3}'}\right)^2} \times \widehat{\left(\frac{a_{4,3}'}{a_{4,1}'}\right)^2} & \widehat{\left(\frac{a_{4,1}'}{a_{2,3}'}\right)^2} \times \widehat{\left(\frac{a_{4,4}'}{a_{4,1}'}\right)^2} \end{bmatrix}$$

For explanations of the elements in $\overset{\backprime}{A}_{4,4}$, refer to the foregoing descriptions. Details are not described herein again.

Based on Manner 2, the indication information may indicate the amplitude matrix by indicating the quantized value of the maximum element in each vector in the amplitude matrix relative to the maximum element in the amplitude matrix, and the quantized value of each element in the vector in the amplitude matrix relative to the maximum element in the vector. Specifically, Manner 2 may be reflected as any one of Manner 2A to Manner 2F below:

It should be noted that, in any one of Manners 2A to 2F, all "vectors" are row vectors, or all "vectors" are column vectors. Whether the vectors are specifically row vectors or column vectors may be preset, or may be configured by the transmit end device for the receive end device. In addition, specific examples in which a "vector" is a row vector are used for description. A unified description is provided herein. Details are not described below again.

Manner 2A: The indication information may carry indexes of the following information: a quantized value of a maximum element in each vector in the amplitude matrix relative to a maximum element in the amplitude matrix, and a quantized value of each element in each vector in the amplitude matrix relative to a maximum element in the vector.

Based on this, the transmit end device may obtain, based on a correspondence between a quantized value and an index of the quantized value, and the index carried in the indication information, a quantized value corresponding to the index carried in the indication information. It should be noted that this step may be included in any one of the following manners. For ease of description, this step is omitted in any one of the following manners. A unified description is provided herein. Details are not described below again). Then, for each vector in the amplitude matrix, the following operations are performed: Quantized values of all elements in the vector relative to the maximum element in the vector are multiplied by the quantized value of the maximum element in the vector relative to the maximum element in the amplitude matrix, to obtain all the elements in the vector. In this way, all elements in the amplitude matrix are obtained.

Based on Example 2, in Manner 2A, the indication information may carry indexes of the following information: quantized values, $$\left(\frac{a'_{1,1}}{a'_{2,3}}\right)^2, \mathcal{V}, \left(\frac{a'_{3,2}}{a'_{2,3}}\right)^2, \text{ and } \left(\frac{a'_{4,1}}{a'_{2,3}}\right)^2,$$

of maximum elements in rows of the amplitude matrix relative to the maximum element in the amplitude matrix, quantized values, $\mathcal{V}$, $$\left(\frac{a'_{1,2}}{a'_{1,1}}\right)^2, \left(\frac{a'_{1,3}}{a'_{1,1}}\right)^2, \text{ and } \left(\frac{a'_{1,4}}{a'_{1,1}}\right)^2,$$

of elements in the first row of the amplitude matrix relative to a maximum element $a_{1,1}$ in the row, quantized values, $$\left(\frac{a'_{2,1}}{a'_{2,3}}\right)^2, \left(\frac{a'_{2,2}}{a'_{2,3}}\right)^2, \mathcal{V}, \text{ and } \left(\frac{a'_{2,4}}{a'_{2,3}}\right)^2,$$

of elements in the second row of the amplitude matrix relative to a maximum element $a_{2,3}$ in the row, quantized values, $$\left(\frac{a'_{3,1}}{a'_{3,1}}\right)^2, \mathcal{V}, \left(\frac{a'_{3,3}}{a'_{3,2}}\right)^2, \left(\frac{a'_{3,4}}{a'_{3,2}}\right)^2,$$

of elements in the third row of the amplitude matrix relative to a maximum element $a_{3,2}$ in the row, and quantized values, $\mathcal{V}$, $$\left(\frac{a'_{4,2}}{a'_{4,1}}\right)^2, \left(\frac{a'_{4,3}}{a'_{4,1}}\right)^2, \text{ and } \left(\frac{a'_{4,4}}{a'_{4,1}}\right)^2,$$

of elements in the fourth row of the amplitude matrix relative to a maximum element $a_{4,1}$ in the row. The transmit end device may multiply the quantized values, $$\left(\frac{a'_{1,2}}{a'_{1,1}}\right)^2, \left(\frac{a'_{1,3}}{a'_{1,1}}\right)^2, \text{ and } \left(\frac{a'_{1,4}}{a'_{1,1}}\right)^2,$$

of the elements in the first row relative to the maximum element in the row by a quantized value $$\left(\frac{a'_{1,1}}{a'_{2,3}}\right)^2$$

of the maximum element in the first row relative to the maximum element in the amplitude matrix, to obtain the elements in the first row in $\overset{\prime}{A}_{4,4}$. By analogy, all the elements in $\overset{\prime}{A}_{4,4}$ can be obtained.

Manner 2B: The indication information may carry indexes of the following information: a quantized value of a maximum element in each vector in the amplitude matrix relative to a maximum element in the amplitude matrix, a location of a maximum element in each vector in the amplitude matrix in the vector, and a quantized value of an element in each vector in the amplitude matrix other than a maximum element relative to the maximum element in the vector. For example, an index of a location of a maximum element in a row vector in the amplitude matrix in the vector may be a number of a column in which the maximum element in the row vector is located. For example, an index of a location of a maximum element in a column vector in the amplitude matrix in the vector may be a number of a row in which the maximum element in the column vector is located.

Based on this, for each vector in the amplitude matrix, the transmit end device may perform the following operations: Based on the location of the maximum element in the vector in the vector, and the quantized value of the element in the vector other than the maximum element relative to the maximum element in the vector, the quantized value of each element in the vector relative to the maximum element in the vector is obtained. In this way, all the elements in the amplitude matrix are obtained based on the related description in Manner 2A.

Based on Example 2, in Manner 2B, the indication information may carry indexes of the following information:

$$\left(\frac{a'_{1,1}}{a'_{2,3}}\right)^2, \ddot{Y}, \left(\frac{a'_{3,2}}{a'_{2,3}}\right)^2, \text{and } \left(\frac{a'_{4,1}}{a'_{2,3}}\right)^2,$$

a location (that is, the first column) of a maximum element $a_{1,1}$ in the first row of the amplitude matrix in the first row, a location (that is, the third column) of a maximum element $a_{2,3}$ in the second row of the amplitude matrix in the second row, a location (that is, the second column) of a maximum element $a_{3,2}$ in the third row of the amplitude matrix in the third row, a location (that is, the first column) of a maximum element $a_{4,1}$ in the fourth row of the amplitude matrix in the fourth row, and $$\left(\frac{a'_{1,2}}{a'_{1,1}}\right)^2, \left(\frac{a'_{1,3}}{a'_{1,1}}\right)^2, \left(\frac{a'_{1,4}}{a'_{1,1}}\right)^2, \left(\frac{a'_{2,1}}{a'_{2,3}}\right)^2, \left(\frac{a'_{2,2}}{a'_{2,3}}\right)^2, \left(\frac{a'_{2,4}}{a'_{2,3}}\right)^2,$$

$$\left(\frac{a'_{3,1}}{a'_{3,2}}\right)^2, \left(\frac{a'_{3,3}}{a'_{3,2}}\right)^2, \left(\frac{a'_{3,4}}{a'_{3,2}}\right)^2, \left(\frac{a'_{4,2}}{a'_{4,1}}\right)^2, \left(\frac{a'_{4,3}}{a'_{4,1}}\right)^2, \text{and } \left(\frac{a'_{4,4}}{a'_{4,1}}\right)^2.$$

For example, the receive end device may include a column number, "1", in the indication information to indicate that the maximum element in the first row is $a_{1,1}$. A manner of indicating a location of a maximum element in another row in the another row is similar to this, and details are not described again. The transmit end device may obtain the quantized values $\ddot{Y}$), $$\left(\frac{a'_{1,2}}{a'_{1,1}}\right)^2, \left(\frac{a'_{1,3}}{a'_{1,1}}\right)^2, \text{and } \left(\frac{a'_{1,4}}{a'_{1,1}}\right)^2,$$

of elements in the first row relative to the maximum element in the row based on the location (that is, the first column) of the maximum element $a_{1,1}$ in the first row in the amplitude matrix in the first row, and quantized values $$\left(\frac{a'_{1,2}}{a'_{1,1}}\right)^2, \left(\frac{a'_{1,3}}{a'_{1,1}}\right)^2, \text{and } \left(\frac{a'_{1,4}}{a'_{1,1}}\right)^2,$$

of elements in the first row other than the maximum element relative to the maximum element in the row. By analogy, the quantized value of each element in each row relative to the maximum element in the row may be obtained. In this way, all the elements in $\overset{\jmath}{A}_{4,4}$ may be obtained based on the example in Manner 2A.

Manner 2C: The indication information may carry indexes of the following information: a location of a vector in which a maximum element in the amplitude matrix is located in the amplitude matrix, quantized values of maximum elements in vectors in the amplitude matrix other than the vector in which the maximum element in the amplitude matrix is located relative to the maximum element in the amplitude matrix, and a quantized value of each element in each vector in the amplitude matrix relative to a maximum element in the vector.

Based on this, the transmit end device may obtain the quantized value of the maximum element in each vector in the amplitude matrix relative to the maximum element in the amplitude matrix, based on the location of the vector in which the maximum element in the amplitude matrix is located in the amplitude matrix, and the quantized values of the maximum elements in the vectors in the amplitude matrix other than the vector in which the maximum element in the amplitude matrix is located relative to the maximum element in the amplitude matrix. In this way, all the elements in the amplitude matrix are obtained based on the related description in Manner 2A.

Based on Example 2, in Manner 2C, the indication information may carry indexes of the following information: a location (that is, the second row) of a row in which a maximum element $a_{2,3}$ in the amplitude matrix is located in the amplitude matrix, $$\left(\frac{a'_{2,1}}{a'_{2,3}}\right)^2, \left(\frac{a'_{3,2}}{a'_{2,3}}\right)^2, \text{and } \left(\frac{a'_{4,1}}{a'_{2,3}}\right)^2, \text{and } \ddot{Y}, \left(\frac{a'_{1,2}}{a'_{1,1}}\right)^2,$$

$$\left(\frac{a'_{1,3}}{a'_{1,1}}\right)^2, \left(\frac{a'_{1,4}}{a'_{1,1}}\right)^2, \left(\frac{a'_{2,1}}{a'_{2,3}}\right)^2, \left(\frac{a'_{2,2}}{a'_{2,3}}\right)^2, \ddot{Y}, \left(\frac{a'_{2,4}}{a'_{2,3}}\right)^2, \left(\frac{a'_{3,1}}{a'_{3,2}}\right)^2,$$

$$\ddot{Y}, \left(\frac{a'_{3,3}}{a'_{3,2}}\right)^2, \left(\frac{a'_{3,4}}{a'_{3,2}}\right)^2, \ddot{Y}, \left(\frac{a'_{4,2}}{a'_{4,1}}\right)^2, \left(\frac{a'_{4,3}}{a'_{4,1}}\right)^2, \text{and } \left(\frac{a'_{4,4}}{a'_{4,1}}\right)^2.$$

The transmit end device may obtain quantized values, $$\left(\frac{a'_{2,1}}{a'_{2,3}}\right)^2, \ddot{Y}, \left(\frac{a'_{3,2}}{a'_{2,3}}\right)^2, \text{and } \left(\frac{a'_{4,1}}{a'_{2,3}}\right)^2,$$

of maximum elements in vectors in the amplitude matrix relative to the maximum element in the amplitude matrix, based on the location of the vector in which the maximum element in the amplitude matrix is located in the amplitude matrix, and quantized values, $$\left(\frac{a'_{2,1}}{a'_{2,3}}\right)^2, \left(\frac{a'_{3,2}}{a'_{2,3}}\right)^2, \text{and } \left(\frac{a'_{4,1}}{a'_{2,3}}\right)^2,$$

of maximum elements in vectors in the amplitude matrix other than the vector in which the maximum element in the amplitude matrix is located relative to the maximum element in the amplitude matrix. In this way, all the elements in $\overset{\jmath}{A}_{4,4}$ can be obtained based on the related description in Manner 2A.

Manner 2D: The indication information may carry indexes of the following information: a location of a maximum element in the amplitude matrix in the amplitude matrix, quantized values of maximum elements in vectors in the amplitude matrix other than the vector in which the maximum element in the amplitude matrix is located relative to the maximum element in the amplitude matrix, and a quantized value of each element in the amplitude matrix other than the maximum element in the amplitude matrix relative to a maximum element in a vector in which the element is located. Compared with Manner 2C, in Manner 2D, the indication information already carries the location of the maximum element in the amplitude matrix in the amplitude matrix, and a quantized value of the maximum element in the amplitude matrix relative to the maximum element in the amplitude matrix is 1. Therefore, the quantized value, 1, may not need to be carried. Based on this, for descriptions of obtaining the amplitude matrix by the transmit end device, refer to Manner 2C.

Manner 2E: The indication information may carry indexes of the following information: a location of a vector in which a maximum element in the amplitude matrix is located in the amplitude matrix, a quantized value of a maximum element in a vector in the amplitude matrix other than the vector in which the maximum element in the amplitude matrix is located relative to the maximum element in the amplitude matrix, a location of a maximum element in each vector in the amplitude matrix in the vector, and a quantized value of an element in each vector in the amplitude matrix other than a maximum element relative to the maximum element in the vector. Based on this, for descriptions of obtaining the amplitude matrix by the transmit end device, refer to Manner 2B and Manner 2C.

Based on Example 2, in Manner 2E, the indication information may carry indexes of the following information: a location (that is, the second row) of a vector in which a maximum element $a_{2,3}$ in the amplitude matrix is located in the amplitude matrix, $$\left(\frac{a'_{1,1}}{a'_{2,3}}\right)^2, \left(\frac{a'_{3,2}}{a'_{2,3}}\right)^2, \text{ and } \left(\frac{a'_{4,1}}{a'_{2,3}}\right)^2,$$

a location (that is, the first column) of $a_{1,1}$ in the first row, a location (that is, the third column) of $a_{2,3}$ in the second row, a location (that is, the second column) of $a_{3,2}$ in the third row, a location (that is, the first column) of $a_{4,1}$ in the fourth row, and $$\left(\frac{a'_{1,2}}{a'_{1,1}}\right)^2, \left(\frac{a'_{1,3}}{a'_{1,1}}\right)^2, \left(\frac{a'_{1,4}}{a'_{1,1}}\right)^2, \left(\frac{a'_{2,1}}{a'_{2,3}}\right)^2, \left(\frac{a'_{2,2}}{a'_{2,3}}\right)^2, \left(\frac{a'_{2,4}}{a'_{2,3}}\right)^2,$$

$$\left(\frac{a'_{3,1}}{a'_{3,2}}\right)^2, \left(\frac{a'_{3,3}}{a'_{3,2}}\right)^2, \left(\frac{a'_{3,4}}{a'_{3,2}}\right)^2, \left(\frac{a'_{4,2}}{a'_{4,1}}\right)^2, \left(\frac{a'_{4,3}}{a'_{4,1}}\right)^2, \text{ and } \left(\frac{a'_{4,4}}{a'_{4,1}}\right)^2.$$

The transmit end device may obtain all the elements in $\overset{J}{A}_{4,4}$ with reference to Manner 2B and Manner 2C.

Manner 2F: The indication information may carry indexes of the following information: a location of a maximum element in the amplitude matrix in the amplitude matrix, quantized values of maximum elements in vectors in the amplitude matrix other than the vector in which the maximum element in the amplitude matrix is located relative to the maximum element in the amplitude matrix, locations of maximum elements in vectors in the amplitude matrix other than the vector in which the maximum element is located in the vectors, and quantized values of elements in each vector in the amplitude matrix other than a maximum element relative to the maximum element in the vector. Compared with Manner 2E, in Manner 2F, the indication information already carries the location of the maximum element in the amplitude matrix in the amplitude matrix. In other words, the transmit end device can already learn of the location of the maximum element in the amplitude matrix in the vector in which the maximum element is located. Therefore, the location of the maximum element in the amplitude matrix in the vector in which the maximum element is located does not need to be further carried. For descriptions of obtaining the amplitude matrix by the transmit end device, refer to Manner 2B and Manner 2C.

Based on Example 2, in Manner 2F, the indication information may carry indexes of the following information: a location (that is, the second row and the third column) of a maximum element $a_{2,3}$ in the amplitude matrix in the amplitude matrix, $$\left(\frac{a'_{2,1}}{a'_{2,3}}\right)^2, \left(\frac{a'_{3,2}}{a'_{2,3}}\right)^2, \text{ and } \left(\frac{a'_{4,1}}{a'_{2,3}}\right)^2,$$

a location (that is, the first column) of $a_{1,1}$ in the first row, a location (that is, the second column) of $a_{3,2}$ in the third row, a location (that is, the first column) of $a_{4,1}$ in the fourth row, and $$\left(\frac{a'_{1,2}}{a'_{1,1}}\right)^2, \left(\frac{a'_{1,3}}{a'_{1,1}}\right)^2, \left(\frac{a'_{1,4}}{a'_{1,1}}\right)^2, \left(\frac{a'_{2,1}}{a'_{2,3}}\right)^2, \left(\frac{a'_{2,2}}{a'_{2,3}}\right)^2, \left(\frac{a'_{2,4}}{a'_{2,3}}\right)^2,$$

$$\left(\frac{a'_{3,1}}{a'_{3,2}}\right)^2, \left(\frac{a'_{3,3}}{a'_{3,2}}\right)^2, \left(\frac{a'_{3,4}}{a'_{3,2}}\right)^2, \left(\frac{a'_{4,2}}{a'_{4,1}}\right)^2, \left(\frac{a'_{4,3}}{a'_{4,1}}\right)^2, \text{ and } \left(\frac{a'_{4,4}}{a'_{4,1}}\right)^2.$$

Compared with the example in Manner 2E, it can be learned that in Manner 2F, the indication information already carries the location (that is, the second row and the third column) of the maximum element $a_{2,3}$ in the amplitude matrix in the amplitude matrix. In other words, the transmit end device may already learn that the maximum element $a_{2,3}$ in the amplitude matrix is located in the third column of the amplitude matrix. Therefore, the location (that is, the third column) of the maximum element $a_{2,3}$ in the amplitude matrix in the third row does not need to be carried.

It should be noted that some or all technical features in any quantity of technical solutions provided in the embodiments of this application may be used in combination without a conflict. For example, the indication information may be specifically used to indicate the following information to indicate the amplitude matrix: a quantized value of a maximum element in each vector in the amplitude matrix relative to a maximum element in the amplitude matrix, locations of maximum elements in some vectors in the amplitude matrix in the vectors, quantized values of elements in the some vectors other than the maximum elements relative to the maximum elements in the vectors, and quantized values of elements in the other vectors in the amplitude matrix relative to maximum elements in the vectors. The vectors herein are all row vectors or column vectors. Whether the vectors are specifically row vectors or column vectors may be preset, or may be configured by the transmit end device for the receive end device.

Manner 3: The receive end device may quantize each row vector, and quantize each column vector. Specifically, a quantized value of each row vector in the amplitude matrix relative to a maximum row vector is calculated, and a quantized value of each column vector in the amplitude matrix relative to a maximum column vector is calculated. Optionally, each row vector is normalized before the quantized value of each row vector relative to the maximum row vector is calculated. Each column vector is normalized before the quantized value of each column vector relative to the maximum column vector is calculated.

An implementation about how the receive end device determines the maximum row vector is not limited in this embodiment of this application. For example, a row vector including the maximum element in the amplitude matrix is the maximum row vector; a row vector including a maximum sum of elements is the maximum row vector; or a row vector including a maximum sum of squares of elements is the maximum row vector. If the row vector including the maximum element in the amplitude matrix is the maximum row vector, the quantized value of each row vector in the amplitude matrix relative to the maximum row vector is a quantized value of a maximum element in each row vector in the amplitude matrix relative to the maximum element in the maximum row vector. If the row vector including the maximum sum of elements is the maximum row vector, the quantized value of each row vector in the amplitude matrix relative to the maximum row vector is a quantized value of a sum of elements in each row vector in the amplitude matrix relative to a sum of elements in the maximum row vector. If the row vector including the maximum sum of squares of elements is the maximum row vector, the quantized value of each row vector in the amplitude matrix relative to the maximum row vector is a quantized value of a sum of squares of elements in each row vector in the amplitude matrix relative to a sum of squares of elements in the maximum row vector. The "row vector" in this paragraph may be replaced with a column vector, to obtain an implementation in which the receive end device determines a maximum column vector and calculates a quantized value of each column vector in the amplitude matrix relative to the maximum column vector.

A quantization scheme used for quantizing each row vector may be the same as or different from a quantization scheme used for quantizing each column vector. Both the quantization scheme used for quantizing each row vector and the quantization scheme used for quantizing each column vector may be preset, for example, preset in a protocol; or may be configured by the transmit end device for the receive end device. For example, the transmit end device may perform configuration by using at least one of RRC signaling, MAC signaling, and DCI.

Based on Manner 3, assuming that the amplitude matrix is a K×L matrix, if quantized values of row vectors in the amplitude matrix relative to the maximum row vector are $g_1$ to $g_K$, and quantized values of column vectors relative to the maximum column vector are $h_1$ to $h_L$, a quantized value of a $(k,l)^{th}$ element in the amplitude matrix is $g_k*h_l$. Assuming that the amplitude matrix is an L×K matrix, if quantized values of row vectors in the amplitude matrix relative to the maximum row vector are $h_1$ to $h_L$, and quantized values of column vectors relative to the maximum column vector are $g_1$ to $g_K$, a quantized value of an $(l,k)^{th}$ element in the amplitude matrix is $g_k*h_l$. $1 \le k \le K$, and $1 \le l \le L$.

Based on Manner 3, the indication information may indicate the amplitude matrix by indicating the quantized values of the row vectors in the amplitude matrix relative to the maximum row vector, and the quantized values of the column vectors in the amplitude matrix relative to the maximum column vector. Specifically, Manner 3 may be reflected as any one of Manner 3A to Manner 3D below:

Manner 3A: The indication information may carry indexes of the following information: a quantized value of each row vector in the amplitude matrix relative to the maximum row vector, and a quantized value of each column vector in the amplitude matrix relative to the maximum column vector. Based on this, the transmit end device may obtain a $(k,l)^{th}$ element or an $(l,k)^{th}$ element in the amplitude matrix based on $g_k*h_l$. For related explanations of $g_k$ and $h_l$, refer to the foregoing descriptions.

Manner 3B: The indication information may carry indexes of the following information: a quantized value of each row vector in the amplitude matrix relative to the maximum row vector, a location of the maximum column vector in the amplitude matrix in the amplitude matrix, and quantized values of column vectors in the amplitude matrix other than the maximum column vector relative to the maximum column vector. Based on this, the transmit end device may obtain a quantized value of each column vector in the amplitude matrix relative to the maximum column vector based on the location of the maximum column vector in the amplitude matrix in the amplitude matrix, and the quantized values of the column vectors in the amplitude matrix other than the maximum column vector relative to the maximum column vector. In this way, all the elements in the amplitude matrix are obtained with reference to the related descriptions in Manner 3A.

Manner 3C: The indication information may carry indexes of the following information: a location of the maximum row vector in the amplitude matrix, quantized values of row vectors in the amplitude matrix other than the maximum row vector relative to the maximum row vector, and a quantized value of each column vector in the amplitude matrix relative to the maximum column vector. Based on this, the transmit end device may obtain a quantized value of each row vector in the amplitude matrix relative to the maximum row vector based on the location of the maximum row vector in the amplitude matrix, and the quantized values of the row vectors in the amplitude matrix other than the maximum row vector relative to the maximum row vector. In this way, all the elements in the amplitude matrix are obtained with reference to the related descriptions in Manner 3A.

Manner 3D: The indication information may carry indexes of the following information: a location of the maximum row vector in the amplitude matrix, quantized values of row vectors in the amplitude matrix other than the maximum row vector relative to the maximum row vector, a location of the maximum column vector in the amplitude matrix in the amplitude matrix, and quantized values of column vectors in the amplitude matrix other than the maximum column vector relative to the maximum column vector. Based on this, the transmit end device may obtain all the elements in the amplitude matrix with reference to Manner 3B and Manner 3C.

In some other embodiments of this application, the indication information is specifically used to indicate the following information, to indicate the amplitude matrix: a quantization scheme corresponding to each vector in the amplitude matrix, and a quantized value of each element in the vector in the quantization scheme. Each vector in the amplitude matrix is each row vector or column vector in the amplitude matrix. Specifically, whether each vector is specifically a row vector or a column vector may be agreed on by the transmit end device and the receive end device in advance, or may be configured by the transmit end device for the receive end device. It can be learned that this embodiment of this application supports a technical solution in which each vector is quantized by using a different quantization scheme.

An attribute of the quantization scheme may include a quantity of quantization bits and a quantization algorithm. For a specific example, refer to the quantization scheme shown in Manner 1B.

During specific implementation, the transmit end device and the receive end device may preset at least two quantization schemes and indexes of the quantization schemes, or the transmit end device configures at least two quantization schemes and indexes of the quantization schemes for the receive end device. For example, the at least two quantization schemes include the two quantization schemes shown in Manner 1B. Optionally, a quantization scheme in which a quantity of bits is another number (not 3) may be further included. After selecting a quantization scheme corresponding to a vector, the receive end device may add an index of the selected quantization scheme to the indication information, to indicate the quantization scheme. In this way, the indication information carries an index of a quantized value of a corresponding element, and indicates the quantized value of the element. For example, assuming that a quantization scheme that is corresponding to a vector and that is determined by the receive end device is the second quantization scheme shown in Manner 1B, that is, if a quantity of quantization bits is 3 and a quantization algorithm is a linear value quantization algorithm, the quantization scheme may be as follows: Indexes 000 to 111 of quantized values respectively correspond to normalization coefficients $1/8$, $1/4$, $3/8$, $1/2$, $5/8$, $3/4$, $7/8$ and 1. In addition, quantized values of elements in the vector are respectively $1/8$, $1/4$, $1/8$, and $3/8$. In this case, the indication information may carry the quantization scheme and indexes 000, 001, 000, and 010 of the quantized values of the elements in the vector.

It can be learned that this embodiment of this application supports a technical solution in which any two row vectors (or column vectors) in the amplitude matrix are quantized by using different quantization schemes. Different quantization schemes may be reflected as different quantities of quantization bits and/or different quantization algorithms. In this way, the receive end device selects an appropriate quantization scheme for each row vector (or column vector) in the amplitude matrix. This helps improve quantization precision of some vectors and reduce quantization bit overheads of some other vectors, thereby improving overall precoding performance.

In some other embodiments of this application, the indication information is specifically used to indicate the following information, to indicate the amplitude matrix: a first location set in the amplitude matrix, a quantized value of an element (an element at a location in the first location set) corresponding to the first location set, and a quantized value of an element in the amplitude matrix other than the element corresponding to the first location set. A quantization scheme of the element corresponding to the first location set is different from a quantization scheme of the other element in the amplitude matrix. The first location set is a set formed by a location of at least one element. Specifically, the at least one element may be a submatrix of the amplitude matrix. Certainly, the at least one element may not form a matrix. The indication information may explicitly indicate the first location set, or may implicitly indicate the first location set.

For example, the receive end device may indicate the first location set by adding numbers of one or more rows in the amplitude matrix to the indication information. The first location set is a set formed by locations of elements in the one or more rows. In this example, the indication information explicitly indicates the first location set by carrying the numbers of the one or more rows. For example, if the first location set is a set formed by locations of elements in one or more columns in the amplitude matrix, the receive end device may indicate the first location set by adding numbers of the one or more columns to the indication information.

For example, with reference to Manner 2, the receive end device may implicitly indicate the first location set by carrying a first-level quantization result. For example, the receive end device and the transmit end device may determine the first location set according to the following rule: A row in which a quantized value of a maximum element is greater than a threshold forms the first location set, where the row is in all rows in the amplitude matrix; or rows in which several quantized values are located form the first location set, where the several quantized values are the first values in a sequence obtained by sorting quantized values of maximum elements in all rows in the amplitude matrix in descending order. If quantized values of maximum elements in any quantity of rows are equal, the plurality of equal quantized values may be sorted according to a preset rule (for example, a rule in which a quantized value with a smaller row number ranks first, or a rule in which a quantized value with a smaller row number ranks last). The rule may be preset, or may be configured by the transmit end device for the receive end device. For example, based on Example 2, it is assumed that the rule is that rows in which two quantized values are located form the first location set, where the two quantized values are the first two values in a sequence obtained by sorting quantized values of maximum elements in all rows in the amplitude matrix in descending order, and a sequence obtained by sorting maximum elements $a_{1,1}$, $a_{2,3}$, $a_{3,2}$, and $a_{4,1}$ in the first row to the fourth row in the amplitude matrix $\acute{A}_{4,4}$ is $a_{2,3}$, $a_{3,2}$, $a_{4,1}$, and $a_{1,1}$. In this case, the first location set is a set formed by the second row and the third row.

In addition, the receive end device may add numbers of one or more rows and numbers of one or more columns to the indication information, to indicate the first location set formed by cross locations of the one or more rows and the one or more columns, or to indicate the first location set formed by locations in the amplitude matrix other than the cross locations, or indicate the first location set formed by all locations of the one or more rows and the one or more columns. For example, assuming that the amplitude matrix is the matrix $\acute{A}_{4,4}$ in Example 1, the receive end device may add numbers of the second row and the third row and numbers of the first column and the second column to the indication information, to indicate locations of elements in a submatrix $$\begin{bmatrix} a_{2,1} & a_{2,2} \\ a_{3,1} & a_{3,2} \end{bmatrix}.$$

A set formed by the locations of the elements is the first location set, or a set formed by locations of elements in the amplitude matrix other than the elements is the first location set.

The following describes the phase matrix.

In some embodiments of this application, the indication information is specifically used to indicate the following information, to indicate the phase matrix: a second location set in the phase matrix, a quantized value of an element (that is, an element at a location in the second location set) corresponding to the second location set, and a quantized value of an element in the phase matrix other than the element corresponding to the second location set. A quantization scheme of the element corresponding to the second location set is different from a quantization scheme of the other element in the phase matrix. For example, a quantity of quantization bits may be 2 or 3. Both the quantization scheme for the element corresponding to the second location set and the quantization scheme of the other element in the phase matrix may be preset, or may be configured by the transmit end device for the receive end device, for example, may be configured by using at least one of RRC signaling, MAC signaling, and DCI. It can be learned that this embodiment of this application supports a technical solution in which a quantization scheme used for some elements in the phase matrix is different from a quantization scheme used for other elements.

The second location set is a set formed by a location of at least one element. Specifically, the at least one element may be a submatrix of the amplitude matrix. Certainly, the at least one element may not form a matrix. The indication information may explicitly indicate the second location set, for example, indicate some rows, or indicate some columns, or indicate an intersection set of some rows and some columns, or indicate a union set of some rows and some columns. In addition, the indication information may alternatively implicitly indicate the second location set, for example, implicitly indicate the second location set according to the following rule: "a location of the second location set in the phase matrix is the same as a location of the first location set in the amplitude matrix (for example, the second location set is the second row and the third row in the phase matrix, and the first location set is the second row and the third row in the amplitude matrix)".

Further, optionally, a quantity of quantization bits of a quantized value of an element corresponding to the first location set is greater than a quantity of quantization bits of a quantized value of another element in the amplitude matrix, and a quantity of quantization bits of a quantized value of an element corresponding to the second location set is greater than a quantity of quantization bits of a quantized value of another element in the phase matrix. In other words, for different weights in the weight matrix, a larger quantity of quantization bits may be used to quantize an amplitude of a weight with a larger amplitude, and a larger quantity of quantization bits may be used to quantize a phase of the weight. This helps improve precoding precision, and improve overall performance of a system.

The foregoing descriptions are all based on an example in which there is one polarization direction. Assuming that the foregoing descriptions are all based on two polarization directions, cases are as follows:

For an amplitude matrix, each polarization direction may be corresponding to an amplitude matrix $\acute{A}_{K,L}$ or $\acute{A}_{L,K}$. In this case, in an optional implementation, two amplitude matrices $\acute{A}_{K,L}$ corresponding to the two polarization directions may form a 2K×L matrix for joint indication; or two amplitude matrices $\acute{A}_{L,K}$ corresponding to the two polarization directions may form a 2L×K matrix for joint indication. For a method by using which the receive end device quantizes and indicates a to-be-quantized amplitude matrix of 2K×L or 2L×K, and the transmit end device obtains the amplitude matrix of 2K×L or 2L×K based on the indication information, refer to the method for correspondingly processing the to-be-quantized amplitude matrix or amplitude matrix of K×L or L×K in the foregoing description. Details are not described herein again. In this way, a relative value relationship between amplitude matrices in two polarization directions can be reflected, thereby improving precoding precision and improving overall performance of the system.

For a phase matrix, each polarization direction may be corresponding to a phase matrix $\acute{P}_{K,L}$ or $\acute{P}_K$. In this case, in an optional implementation, two phase matrices $\acute{P}_{K,L}$ corresponding to the two polarization directions may form a 2K×L matrix for joint indication; or two phase matrices $\acute{P}_{L,K}$ corresponding to the two polarization directions may form a 2L×K matrix for joint indication. In another optional implementation, the two phase matrices $\acute{P}_{K,L}$ or $\acute{P}_{L,K}$ corresponding to the two polarization directions may be independently indicated. In this way, indication is independently performed, and implementation is simple. In another optional implementation, if the two phase matrices $\acute{P}_{K,L}$ or $\acute{P}_{L,K}$ corresponding to the two polarization directions may be independently indicated, partial indication information used in the two polarization directions may be the same. For example, but not limited to, second location sets used in the two polarization directions are the same. In this case, only one piece of the partial indication information may be indicated, so that signaling overheads can be reduced.

For the K spatial-domain component vectors and the L frequency-domain component vectors, K spatial-domain component vectors used in each polarization direction may be the same or may be different. If the K spatial-domain component vectors are the same, the indication information needs to indicate only one group of K spatial-domain component vectors for the two polarization directions. L frequency-domain component vectors used in each polarization direction may be the same or may be different. If the L frequency-domain component vectors are the same, the indication information needs to indicate only one group of L frequency-domain components for the two polarization directions.

The foregoing is described based on an example of one spatial stream. It is assumed that the foregoing is described based on an example of a plurality of spatial streams, the transmit end device needs to construct a plurality of spatial-frequency matrices. In this case, related information of an amplitude matrix used to construct each spatial stream may be independently indicated, and related information of a phase matrix used to construct each spatial stream may also be independently indicated. During independent indication, partial indication information used by all spatial streams may be the same. For example, second location sets are the same. In addition, all spatial streams may use a same spatial-domain component vector or different spatial-domain component vectors, and all spatial streams may use a same frequency-domain component vector or different frequency-domain component vectors.

Based on any one of the foregoing embodiments provided above, when indicating a plurality of rows (or columns) by using numbers of the plurality of rows (or columns), the receive end device may independently indicate a number of each row (or column) in the plurality of rows (or columns), or may perform combined indication on numbers of the plurality of rows (or columns). For example, based on the amplitude matrix $\overset{\blacktriangle}{A}_{4,4}$ shown in Example 1, assuming that the first row, the second row, and the fourth row need to be indicated, the indication information may carry numbers of the first row, the second row, and the fourth row. Alternatively, three rows are selected from four rows, and there are a total of four ($C_4^3=4$) possible combinations, which are respectively: a combination of the first row, the second row, and the third row, a combination of the first row, the second row, and the fourth row, a combination of the first row, the third row, and the fourth row, and a combination of the second row, the third row, and the fourth row. Therefore, the receive end device and the transmit end device may preset an index number corresponding to each of the four combinations. Therefore, the indication information may carry the index number corresponding to the combination of the first row, the second row, and the fourth row.

The following describes a frequency-domain component vector.

Optionally, the frequency-domain component vector is selected from the frequency-domain component vector set. The frequency-domain component vector set includes at least two frequency-domain component vector subsets, and each frequency-domain component vector subset includes at least two frequency-domain component vectors.

Based on this optional manner, the frequency-domain component vector may be an oversampled DFT vector or a vector formed by some elements in an oversampled DFT vector. Specifically, if the quantity of DFT points is equal to Nsb, the frequency-domain component vector is an oversampled DFT vector. If the quantity of DFT points is greater than Nsb, the frequency-domain component vector may be a vector formed by some elements (where a quantity of the some elements is equal to a quantity of elements in the oversampled DFT vector) in the oversampled DFT vector, and the some elements may be first Nsb elements or last Nsb elements in the oversampled DFT vector. Certainly, this application is not limited thereto. Nsb is a quantity of frequency bands included in the system bandwidth or a quantity of frequency bands corresponding to channel information to be fed back, and the quantity of frequency bands into which the system bandwidth is divided is greater than or equal to the quantity of frequency bands corresponding to the channel information to be fed back by the receive end device, as indicated by the transmit end device.

Based on this optional manner, the indication information may include an index of the frequency-domain component vector subset to which the L frequency-domain component vectors belong and indexes of the L frequency-domain component vectors, to indicate the L frequency-domain component vectors. The L frequency-domain component vectors may be selected from one frequency-domain component vector subset, or may be selected from a plurality of frequency-domain component vector subsets. If the L frequency-domain component vectors are selected from a plurality of frequency-domain component vector subsets, the indication information may include indexes of the plurality of frequency-domain component vector subsets.

Based on this optional manner, the quantity of DFT points may be predefined, or may be configured by the transmit end device for the receive end device. If the quantity of DFT points is configured by the transmit end device for the receive end device, the transmit end device may perform configuration in an explicit indication manner, or may perform configuration by using an implicit indication method. For example, if configuration is performed in an explicit indication manner, the transmit end device may perform configuration by using at least one of RRC signaling, MAC signaling, and DCI. For example, if configuration is performed in an implicit indication manner, specifically, the quantity of DFT points may be implicitly indicated by configuring Nsb.

Based on this optional manner, the frequency-domain component vector is represented as Formula 1 or Formula 2 below:

$$u_n = \begin{bmatrix} 1 & e^{j\frac{2\pi n}{O_{freq}N_{DFT}}} & L & e^{j\frac{2\pi n(Nsb-1)}{O_{freq}N_{DFT}}} \end{bmatrix}^T \quad \text{Formula 1}$$

$$u_n = \begin{bmatrix} 1 & e^{-j\frac{2\pi n}{O_{freq}N_{DFT}}} & L & e^{-j\frac{2\pi n(Nsb-1)}{O_{freq}N_{DFT}}} \end{bmatrix}^T \quad \text{Formula 2}$$

Based on either Formula 1 or Formula 2, $N_{DFT}$ is a quantity of DFT points. $O_{freq}$ is a quantity of frequency-domain component vector subsets in a frequency-domain component vector set, $n=O_{freq}m+q$, $q \in \{0,1,K,O_{freq}-1\}$, $m \in \{0,1,K,N_{DFT}-1\}$, or $m \in \{0,1,K,Nsb-1\}$, and $u_n$ is an $m^{th}$ frequency-domain component vector in a $q^{th}$ frequency-domain component vector subset in the frequency-domain component vector set. $O_{freq}$ may be preset, or may be configured by the transmit end device for the receive end device. A quantity of elements included in the frequency-domain component vector is preset, or is configured by the transmit end device for the receive end device. Optionally, the quantity of DFT points, $N_{DFT}$, may be Nsb or $2^{\lceil \log_2 Nsb \rceil}$, or may be determined based on a correspondence between a quantity of DFT points and Nsb.

Based on Formula 1 or Formula 2, that the indication information includes the index of the frequency-domain component vector subset to which the L frequency-domain component vectors belong and the indexes of the L frequency-domain component vectors, to indicate the L frequency-domain component vectors may be specifically reflected as follows: The indication information includes a number, for example, q, of a frequency-domain component vector subset (that is, the frequency-domain component vector subset in which the L frequency-domain component vectors in S101 are located) selected from the frequency-domain component vector set, and numbers, for example, m, of L frequency-domain component vectors (that is, the L frequency-domain component vectors in S101) selected from the selected subset. Alternatively, the indication information includes a number, for example, q, of a frequency-domain component vector subset selected from the frequency-domain component vector set, and a number of a combination of frequency-domain component vectors selected from the selected subset. For example, all frequency-domain component vectors in the selected subset are combined, each obtained combination is numbered, and then a number of the combination formed by the selected frequency-domain component vectors is carried in the indication information. Certainly, this application is not limited thereto. It should be noted that, during specific implementation, the frequency-domain component vector subset may be reflected by using a two-dimensional subscript of a frequency-domain component vector included in the frequency-domain component vector set. For example, a subscript of each frequency-domain component vector included in the frequency-domain component vector set includes two parts: q and m. For example, $u_n$ may be represented as $u_{q,m}$.

If the quantity of DFT points is determined based on a correspondence between a quantity of DFT points and Nsb, in an example, the receive end device and the transmit end device may prestore a table, and the table records the correspondence between Nsb (or an Nsb range) and a quantity of DFT points. For example, each Nsb corresponds to a quantity of DFT points, or an Nsb range corresponds to a quantity of DFT points. In addition, the receive end device and the transmit end device may prestore a rule to indicate the correspondence between a quantity of DFT points and Nsb. For example, when Nsb is less than or equal to 8, the quantity of DFT points is 8, or when Nsb is greater than 8, the quantity of DFT points is equal to Nsb.

Optionally, the frequency-domain component vector is selected from a frequency-domain component vector set, and the frequency-domain component vector set includes at least two frequency-domain component vectors.

Based on this optional manner, the frequency-domain component vector may be a DFT vector or a vector formed by some elements in a DFT vector. Specifically, if the quantity of DFT points is equal to Nsb, the frequency-domain component vector is a DFT vector. If the quantity of DFT points is greater than Nsb, the frequency-domain component vector may be a vector formed by some elements (where a quantity of the some elements is equal to a quantity of elements in the DFT vector) in the DFT vector, and the some elements may be first W elements or last W elements in the DFT vector. Certainly, this application is not limited thereto.

Based on this optional manner, the indication information may include indexes of L frequency-domain component vectors, to indicate the L frequency-domain component vectors.

Based on this optional manner, the quantity of DFT points may be predefined, or may be configured by the transmit end device for the receive end device. For details, refer to the preceding description.

Based on this optional manner, the frequency-domain component vector is represented as Formula 3 or Formula 4 below:

$$u_n = \begin{bmatrix} 1 & e^{j\frac{2\pi n}{N_{DFT}}} & L & e^{j\frac{2\pi n(Nsb-1)}{N_{DFT}}} \end{bmatrix}^T \quad \text{Formula 3}$$

$$u_n = \begin{bmatrix} 1 & e^{-j\frac{2\pi n}{N_{DFT}}} & L & e^{-j\frac{2\pi n(Nsb-1)}{N_{DFT}}} \end{bmatrix}^T \quad \text{Formula 4}$$

Based on either Formula 3 or Formula 4, $n \in \{0,1,K,N_{DFT}-1\}$ or $n \in \{0,1,K,Nsb-1\}$, $u_n$ is an $n^{th}$ frequency-domain component vector in the frequency-domain component vector set. Optionally, the quantity of DFT points is Nsb or $2^{\lceil \log_2 Nsb \rceil}$, or is determined based on a correspondence between a quantity of DFT points and Nsb.

Based on Formula 3 or Formula 4, that the indication information includes the indexes of the L frequency-domain component vectors, to indicate the L frequency-domain component vectors may be specifically reflected as: the indication information includes the numbers, for example, n, of the L frequency-domain component vectors selected from the frequency-domain component vector set. Alternatively, the indication information includes a number of a combination formed by the L frequency-domain component vectors selected from the frequency-domain component vector set. Certainly, this application is not limited thereto. If the quantity of DFT points is determined based on the correspondence between a quantity of DFT points and Nsb, for a specific example, refer to the foregoing descriptions. Details are not described herein again.

Figure 4:
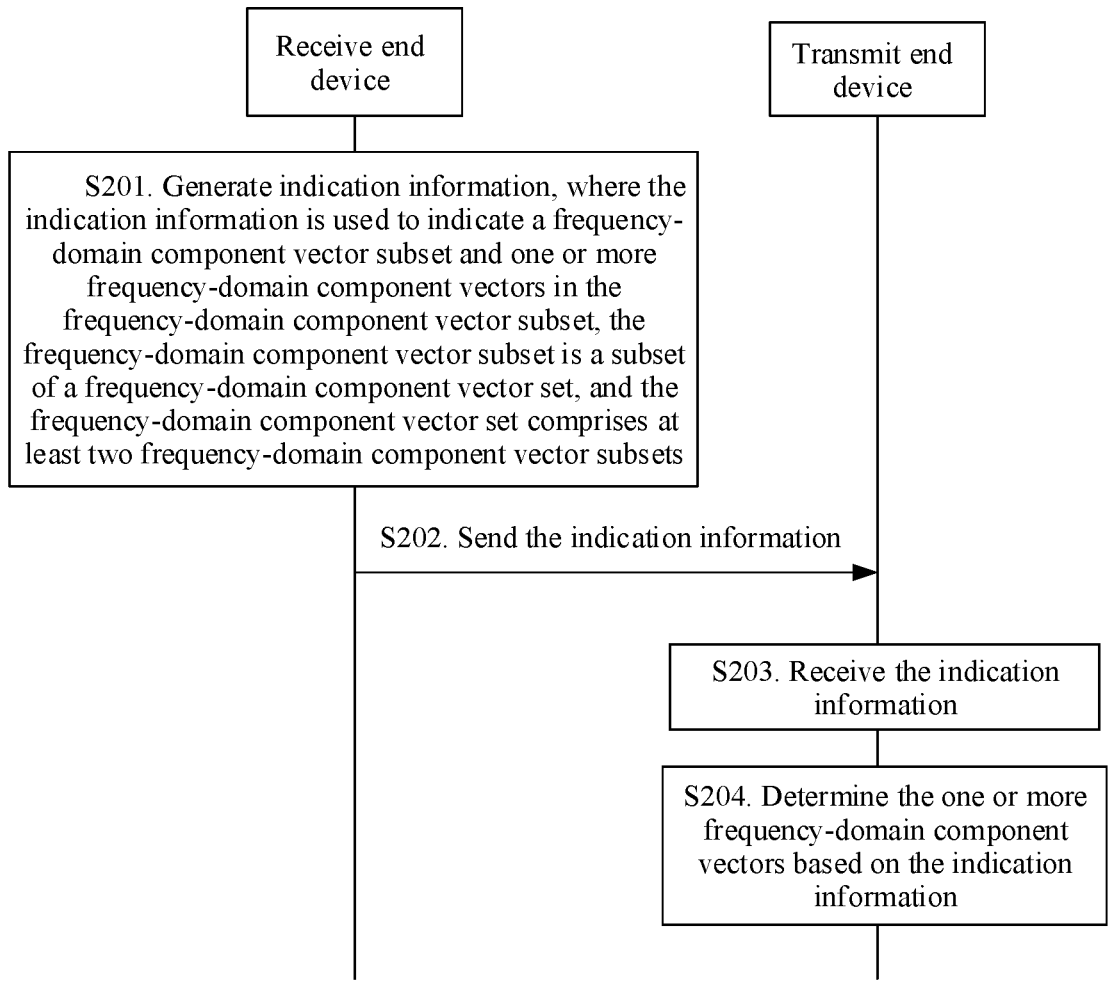
FIG. 4 is a schematic flowchart of an indication method and an information determining method according to an embodiment of this application.

FIG. 4 is a schematic interaction diagram of an indication method and an information determining method according to an embodiment of this application. The method shown in FIG. 4 may include the following steps.

S201: A receive end device generates indication information, where the indication information is used to indicate a frequency-domain component vector subset and one or more frequency-domain component vectors in the frequency-domain component vector subset, the frequency-domain component vector subset is a subset of a frequency-domain component vector set, and the frequency-domain component vector set includes at least two frequency-domain component vector subsets.

S202: The receive end device sends the indication information.

S203: A transmit end device receives the indication information.

S204: The transmit end device determines the one or more frequency-domain component vectors based on the indication information.

An embodiment of this application provides a technical solution to indicating a frequency-domain component vector. For a design manner of the frequency-domain component vector set in this embodiment, refer to the foregoing description. This embodiment may be applied to any scenario in which the receive end device indicates the frequency-domain component vector to the transmit end device. For example, the embodiment may be applied to the channel estimation scenario provided above. In addition, in this embodiment, the frequency-domain component vector may be an oversampled DFT vector or a vector formed by some elements in an oversampled DFT vector.

The foregoing mainly describes the solutions provided in the embodiments of this application from a perspective of a method. To implement the foregoing functions, the method includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the receive end device or the transmit end device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in the embodiments of this application, module division is used as an example, and is merely a logical function division. In actual implementation, another division manner may be used.

Figure 5:
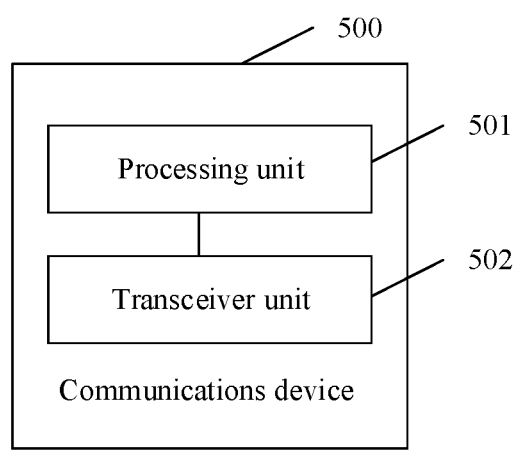
FIG. 5 is a schematic structural diagram of another communications device according to an embodiment of this application.

FIG. 5 is a schematic diagram of a communications device according to an embodiment of this application. The communications device 500 shown in FIG. 5 may be configured to perform the steps performed by the receive end device or the transmit end device in the channel estimation method shown in FIG. 3, or may be configured to perform the steps performed by the receive end device or the transmit end device in the indication and information determining method shown in FIG. 4. The communications device 500 may include a processing unit 501 and a transceiver unit 502.

In an implementation, the processing unit 501 may be configured to generate indication information, where the indication information is used to indicate K N-dimensional spatial-domain component vectors, L M-dimensional frequency-domain component vectors, and a weight matrix, to indicate to construct an M×N-dimensional spatial-frequency matrix, or an M×N or N×M spatial-frequency matrix, where the spatial-frequency matrix includes M N-dimensional precoding vectors, each precoding vector is applied to one of M frequency bands, the spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, where $M \geq 1$, $N \geq 2$, $K \geq 1$, $L \geq 1$, and M, N, K, and L are all integers. The transceiver unit 502 may be configured to send the indication information. For example, with reference to FIG. 3, in this implementation, the communications device 500 may be specifically the receive end device in FIG. 3. The processing unit 501 may be configured to perform S101, and the transceiver unit 502 may be configured to perform S102.

In another implementation, the transceiver unit 502 may be configured to receive indication information, where the indication information is used to indicate K N-dimensional spatial-domain component vectors, L M-dimensional frequency-domain component vectors, and a weight matrix, to indicate to construct an M×N-dimensional spatial-frequency matrix, or an M×N or N×M spatial-frequency matrix, where the spatial-frequency matrix includes M N-dimensional precoding vectors, each precoding vector is applied to one of M frequency bands, the spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, where $M \geq 1$, $N \geq 2$, $K \geq 1$, $L \geq 1$, and M, N, K, and L are all integers. The processing unit 501 may be configured to determine the spatial-frequency matrix based on the indication information. For example, with reference to FIG. 3, in this implementation, the communications device 500 may be specifically the transmit end device in FIG. 3. The processing unit 501 may be configured to perform S104, and the transceiver unit 502 may be configured to perform S103.

In another implementation, the processing unit 501 may be configured to generate indication information, where the indication information is used to indicate a frequency-domain component vector subset and one or more frequency-domain component vectors in the frequency-domain component vector subset, the frequency-domain component vector subset is a subset of a frequency-domain component vector set, and the frequency-domain component vector set includes at least two frequency-domain component vector subsets. The transceiver unit 502 may be configured to send the indication information. For example, with reference to FIG. 4, in this implementation, the communications device 500 may be specifically the receive end device in FIG. 4. The processing unit 501 may be configured to perform S201, and the transceiver unit 502 may be configured to perform S202.

In another implementation, the transceiver unit 502 may be configured to receive indication information, where the indication information is used to indicate a frequency-domain component vector subset and one or more frequency-domain component vectors in the frequency-domain component vector subset, the frequency-domain component vector subset is a subset of a frequency-domain component vector set, and the frequency-domain component vector set includes at least two frequency-domain component vector subsets. The processing unit 501 may be configured to determine the one or more frequency-domain component vectors based on the indication information. For example, with reference to FIG. 4, in this implementation, the communications device 500 may be specifically the transmit end device in FIG. 4. The processing unit 501 may be configured to perform S204, and the transceiver unit 502 may be configured to perform S203.

For explanations of related content in this embodiment, descriptions of beneficial effects, and the like, refer to the foregoing method embodiments. Details are not described herein again. In an example, with reference to the communications device shown in FIG. 2, the processing unit 501 may correspond to the processor 201 or the processor 207 in FIG. 2. The transceiver unit 502 may correspond to the communications interface 204 in FIG. 2.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and the accompanying drawings are merely example description of this application defined by the accompanying claims, and are considered as any of or all modifications, variations, combinations or equivalents that cover the scope of this application. It is clear that a person skilled in the art can make various modifications and variations to this application without departing from the spirit and scope of this application. In this case, this application is intended to cover these modifications and variations of this application provided that they fall within the scope of protection defined by the following claims of this application and their equivalent technologies.

What is claimed is:

1. A channel estimation method, comprising:
receiving indication information, wherein the indication information indicates K N-dimensional spatial-domain component vectors, L M-dimensional frequency-domain component vectors, and a weight matrix, to indicate to construct a N×M spatial-frequency matrix, wherein the N×M spatial-frequency matrix comprises M N-dimensional precoding vectors, each precoding vector is applied to one of M frequency bands, the N×M spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, wherein M≥1, N≥2, K≥1, L≥1, and M, N, K, and L are all integers; and
determining the N×M spatial-frequency matrix based on the indication information.

2. The method according to claim 1, wherein amplitudes of elements in the weight matrix form an amplitude matrix; and the indication information indicates one or more types of following information of the amplitude matrix:
a quantized value of each element in the amplitude matrix relative to a maximum element in the amplitude matrix;
a quantized value of a maximum element in each vector in the amplitude matrix relative to a maximum element in the amplitude matrix, and a quantized value of each element in each vector in the amplitude matrix relative to a maximum element in the vector, wherein each vector in the amplitude matrix is each row vector or column vector in the amplitude matrix; or
a quantized value of each row vector in the amplitude matrix relative to a maximum row vector, and a quantized value of each column vector in the amplitude matrix relative to a maximum column vector.

3. The method according to claim 1, wherein amplitudes of elements in the weight matrix form an amplitude matrix; and the indication information indicates the following information of the amplitude matrix:
a quantization scheme corresponding to each vector in the amplitude matrix, and a quantized value of each element in the vector based on the quantization scheme, wherein each vector in the amplitude matrix is each row vector or column vector in the amplitude matrix.

4. The method according to claim 1, wherein amplitudes of elements in the weight matrix form an amplitude matrix; and the indication information indicates the following information of the amplitude matrix:
a first location set in the amplitude matrix, a quantized value of an element corresponding to the first location set, and a quantized value of another element in the amplitude matrix other than the element corresponding to the first location set, wherein a quantization scheme of the element corresponding to the first location set is different from a quantization scheme of the another element in the amplitude matrix.

5. The method according to claim 1, wherein phases of elements in the weight matrix form a phase matrix; and the indication information indicates the following information of the phase matrix:
a second location set in the phase matrix, a quantized value of an element corresponding to the second location set, and a quantized value of another element in the phase matrix other than the element corresponding to the second location set, wherein a quantization scheme of the element corresponding to the second location set is different from a quantization scheme of the another element in the phase matrix.

6. The method according to claim 5, wherein a location of the second location set in the phase matrix is the same as a location of a first location set in an amplitude matrix, the amplitude matrix is a matrix formed by amplitudes of the elements in the weight matrix, the first location set is a set formed by a location of at least one element in the amplitude matrix, and the quantization scheme of the element corresponding to the first location set is different from the quantization scheme of the element in the amplitude matrix other than the element corresponding to the first location set.

7. The method according to claim 1, wherein the L M-dimensional frequency-domain component vectors are selected from a frequency-domain component vector set, and the frequency-domain component vector set comprises at least two frequency-domain component vector subsets; and the indication information comprises an index of a frequency-domain component vector subset to which the L M-dimensional frequency-domain component vectors belong and a number of combinations of the L M-dimensional frequency-domain component vectors in the frequency-domain component vector subset, that indicate the L M-dimensional frequency-domain component vectors.

8. The method according to claim 7, wherein the frequency-domain component vector is an oversampled discrete fourier transform (DFT) vector, or a vector formed by a plurality of elements in the oversampled DFT vector.

9. The method according to claim 8, wherein a quantity of DFT points of the oversampled DFT vector is determined based on Nsb, and Nsb is a quantity of frequency bands into which system bandwidth is divided, or a quantity of frequency bands corresponding to channel information to be fed back.

10. The method according to claim 9, wherein the quantity of DFT points is Nsb or $2^{\lceil \log_2 Nsb \rceil}$, or is determined based on a correspondence between the quantity of DFT points and Nsb.

11. The method according to claim 1, wherein the L M-dimensional frequency-domain component vectors are selected from a frequency-domain component vector set, and the frequency-domain component vector set comprises at least two frequency-domain component vectors; and the frequency-domain component vector is a DFT vector or a vector formed by a plurality of elements in the DFT vector.

12. A channel estimation apparatus, comprising:
at least one processor; and
one or more memories coupled to the at least one processor and storing programming instructions for execution by the at least one processor to perform a method comprising:
receiving indication information, wherein the indication information indicates K N-dimensional spatial-domain component vectors, L M-dimensional frequency-domain component vectors, and a weight matrix, to indicate to construct a N×M spatial-frequency matrix, wherein the N×M spatial-frequency matrix comprises M N-dimensional precoding vectors, each precoding vector is applied to one of M frequency bands, the N×M spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, wherein M≥1, N≥2, K≥1, L≥1 and M, N, K, and L are all integers; and
determining the N×M spatial-frequency matrix based on the indication information.

13. The apparatus according to claim 12, wherein amplitudes of elements in the weight matrix form an amplitude matrix; and the indication information indicates the following information of the amplitude matrix:
a quantized value of each element in the amplitude matrix relative to a maximum element in the amplitude matrix;
a quantized value of a maximum element in each vector in the amplitude matrix relative to a maximum element in the amplitude matrix, and a quantized value of each element in each vector in the amplitude matrix relative to a maximum element in the vector, wherein each vector in the amplitude matrix is each row vector or column vector in the amplitude matrix; or
a quantized value of each row vector in the amplitude matrix relative to a maximum row vector, and a quantized value of each column vector in the amplitude matrix relative to a maximum column vector.

14. The apparatus according to claim 12, wherein amplitudes of elements in the weight matrix form an amplitude matrix; and the indication information indicates the following information of the amplitude matrix:
a quantization scheme corresponding to each vector in the amplitude matrix, and a quantized value of each element in the vector based on the quantization scheme, wherein each vector in the amplitude matrix is each row vector or column vector in the amplitude matrix.

15. The apparatus according to claim 12, wherein amplitudes of elements in the weight matrix form an amplitude matrix; and the indication information indicates the following information of the amplitude matrix:
a first location set in the amplitude matrix, a quantized value of an element corresponding to the first location set, and a quantized value of another element in the amplitude matrix other than the element corresponding to the first location set, wherein a quantization scheme of the element corresponding to the first location set is different from a quantization scheme of the another element in the amplitude matrix.

16. The apparatus according to claim 12, wherein phases of elements in the weight matrix form a phase matrix; and the indication information indicates the following information of the phase matrix:
a second location set in the phase matrix, a quantized value of an element corresponding to the second location set, and a quantized value of another element in the phase matrix other than the element corresponding to the second location set, wherein a quantization scheme of the element corresponding to the second location set is different from a quantization scheme of the another element in the phase matrix.

17. The apparatus according to claim 16, wherein a location of the second location set in the phase matrix is the same as a location of a first location set in an amplitude matrix, the amplitude matrix is a matrix formed by amplitudes of the elements in the weight matrix, the first location set is a set formed by a location of at least one element in the amplitude matrix, and the quantization scheme of the element corresponding to the first location set is different from the quantization scheme of the element in the amplitude matrix other than the element corresponding to the first location set.

18. The apparatus according to claim 12, wherein the L M-dimensional frequency-domain component vectors are selected from a frequency-domain component vector set, and the frequency-domain component vector set comprises at least two frequency-domain component vector subsets; and the indication information comprises an index of a frequency-domain component vector subset to which the L M-dimensional frequency-domain component vectors belong and a number of combinations of the L M-dimensional frequency-domain component vectors in the frequency-domain component vector subset, that indicate the L M-dimensional frequency-domain component vectors.

19. The apparatus according to claim 18, wherein the frequency-domain component vector is an oversampled discrete fourier transform (DFT) vector, or a vector formed by a plurality of elements in the oversampled DFT vector.

20. The apparatus according to claim 18, wherein a quantity of DFT points of the oversampled DFT vector is determined based on Nsb, and Nsb is a quantity of frequency bands into which system bandwidth is divided, or a quantity of frequency bands corresponding to channel information to be fed back.

21. The apparatus according to claim 20, wherein the quantity of DFT points is Nsb or 2^⌈log₂ Nsb⌉, or is determined based on a correspondence between the quantity of DFT points and Nsb.

22. The apparatus according to claim 12, wherein the L M-dimensional frequency-domain component vectors are selected from a frequency-domain component vector set, and the frequency-domain component vector set comprises at least two frequency-domain component vectors; and the frequency-domain component vector is a DFT vector or a vector formed by a plurality of elements in the DFT vector.

23. A non-transitory computer-readable storage medium storing computer instructions, that when executed by at least one processor, cause the at least one processor to perform operations comprising:
receiving indication information, wherein the indication information indicates K N-dimensional spatial-domain component vectors, L M-dimensional frequency-domain component vectors, and a weight matrix, to indicate to construct a N×M spatial-frequency matrix, wherein the N×M spatial-frequency matrix comprises M N-dimensional precoding vectors, each precoding vector is applied to one of M frequency bands, the N×M spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, wherein M>1, N>2, K>1, L>1, and M, N, K, and L are all integers; and
determining the N×M spatial-frequency matrix based on the indication information.

24. The non-transitory computer-readable storage medium according to claim 23, wherein amplitudes of elements in the weight matrix form an amplitude matrix; and the indication information indicates the following information of the amplitude matrix:
a first location set in the amplitude matrix, a quantized value of an element corresponding to the first location set, and a quantized value of another element in the amplitude matrix other than the element corresponding to the first location set, wherein a quantization scheme of the element corresponding to the first location set is different from a quantization scheme of the another element in the amplitude matrix.

25. The non-transitory computer-readable storage medium according to claim 23, wherein phases of elements in the weight matrix form a phase matrix; and the indication information indicates the following information of the phase matrix:
a second location set in the phase matrix, a quantized value of an element corresponding to the second location set, and a quantized value of another element in the phase matrix other than the element corresponding to the second location set, wherein a quantization scheme of the element corresponding to the second location set is different from a quantization scheme of the another element in the phase matrix.

26. The non-transitory computer-readable storage medium according to claim 25, wherein a location of the second location set in the phase matrix is the same as a location of a first location set in an amplitude matrix, the amplitude matrix is a matrix formed by amplitudes of the elements in the weight matrix, the first location set is a set formed by a location of at least one element in the amplitude matrix, and the quantization scheme of the element corresponding to the first location set is different from the quantization scheme of the element in the amplitude matrix other than the element corresponding to the first location set.

27. The non-transitory computer-readable storage medium according to claim 23, wherein the L M-dimensional frequency-domain component vectors are selected from a frequency-domain component vector set, and the frequency-domain component vector set comprises at least two frequency-domain component vector subsets; and the indication information comprises an index of a frequency-domain component vector subset to which the L M-dimensional frequency-domain component vectors belong and a number of combinations of the L M-dimensional frequency-domain component vectors in the frequency-domain component vector subset, that indicate the L M-dimensional frequency-domain component vectors.

28. A non-transitory computer-readable storage medium storing computer instructions, that when executed by at least one processor, cause the at least one processor to perform operations comprising:
generating indication information, wherein the indication information indicates K N-dimensional spatial-domain component vectors, L M-dimensional frequency-domain component vectors, and a weight matrix, to indicate to construct a N×M spatial-frequency matrix, wherein the N×M spatial-frequency matrix comprises M N-dimensional precoding vectors, each precoding vector is applied to one of M frequency bands, the N×M spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, wherein M>1, N>2, K>1, L>1, and M, N, K, and L are all integers; and
sending the indication information.

29. The non-transitory computer-readable storage medium according to claim 28, wherein amplitudes of elements in the weight matrix form an amplitude matrix; and the indication information indicates the following information of the amplitude matrix:
a first location set in the amplitude matrix, a quantized value of an element corresponding to the first location set, and a quantized value of another element in the amplitude matrix other than the element corresponding to the first location set, wherein a quantization scheme of the element corresponding to the first location set is different from a quantization scheme of the another element in the amplitude matrix.

30. The non-transitory computer-readable storage medium according to claim 28, wherein phases of elements in the weight matrix form a phase matrix; and the indication information indicates the following information of the phase matrix:
a second location set in the phase matrix, a quantized value of an element corresponding to the second location set, and a quantized value of another element in the phase matrix other than the element corresponding to the second location set, wherein a quantization scheme of the element corresponding to the second location set is different from a quantization scheme of the another element in the phase matrix.

31. The non-transitory computer-readable storage medium according to claim 30, wherein a location of the second location set in the phase matrix is the same as a location of a first location set in an amplitude matrix, the amplitude matrix is a matrix formed by amplitudes of the elements in the weight matrix, the first location set is a set formed by a location of at least one element in the amplitude matrix, and the quantization scheme of the element corresponding to the first location set is different from the quantization scheme of the element in the amplitude matrix other than the element corresponding to the first location set.

32. The non-transitory computer-readable storage medium according to claim 28, wherein the L M-dimensional frequency-domain component vectors are selected from a frequency-domain component vector set, and the frequency-domain component vector set comprises at least two frequency-domain component vector subsets; and the indication information comprises an index of a frequency-domain component vector subset to which the L M-dimensional frequency-domain component vectors belong and a number of combinations of the L M-dimensional frequency-domain component vectors in the frequency-domain component vector subset, that indicate the L M-dimensional frequency-domain component vectors.

33. A communications chip comprising at least one processor, wherein the at least one processor is coupled with at least one memory that stores computer instructions, that when executed by the at least one processor, cause the at least one processor to perform operations comprising:
receiving indication information, wherein the indication information indicates K N-dimensional spatial-domain component vectors, L M-dimensional frequency-domain component vectors, and a weight matrix, to indicate to construct a N×M spatial-frequency matrix, wherein the N×M spatial-frequency matrix comprises M N-dimensional precoding vectors, each precoding vector is applied to one of M frequency bands, the N×M spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, wherein M>1, N>2, K>1, L>1, and M, N, K, and L are all integers; and
determining the N×M spatial-frequency matrix based on the indication information.

34. The communications chip according to claim 33, wherein amplitudes of elements in the weight matrix form an amplitude matrix; and the indication information indicates the following information of the amplitude matrix:
a first location set in the amplitude matrix, a quantized value of an element corresponding to the first location set, and a quantized value of another element in the amplitude matrix other than the element corresponding to the first location set, wherein a quantization scheme of the element corresponding to the first location set is different from a quantization scheme of the another element in the amplitude matrix.

35. The communications chip according to claim 33, wherein phases of elements in the weight matrix form a phase matrix; and the indication information indicates the following information of the phase matrix:
a second location set in the phase matrix, a quantized value of an element corresponding to the second location set, and a quantized value of another element in the phase matrix other than the element corresponding to the second location set, wherein a quantization scheme of the element corresponding to the second location set is different from a quantization scheme of the another element in the phase matrix.

36. The communications chip according to claim 35, wherein a location of the second location set in the phase matrix is the same as a location of a first location set in an amplitude matrix, the amplitude matrix is a matrix formed by amplitudes of the elements in the weight matrix, the first location set is a set formed by a location of at least one element in the amplitude matrix, and the quantization scheme of the element corresponding to the first location set is different from the quantization scheme of the element in the amplitude matrix other than the element corresponding to the first location set.

37. The communications chip according to claim 33, wherein the L M-dimensional frequency-domain component vectors are selected from a frequency-domain component vector set, and the frequency-domain component vector set comprises at least two frequency-domain component vector subsets; and the indication information comprises an index of a frequency-domain component vector subset to which the L M-dimensional frequency-domain component vectors belong and a number of combinations of the L M-dimensional frequency-domain component vectors in the frequency-domain component vector subset, that indicate the L M-dimensional frequency-domain component vectors.

38. A communications chip comprising at least one processor, wherein the at least one processor is coupled with at least one memory that stores computer instructions, that when executed by the at least one processor, cause the at least one processor to perform operations comprising:
generating indication information, wherein the indication information indicates K N-dimensional spatial-domain component vectors, L M-dimensional frequency-domain component vectors, and a weight matrix, to indicate to construct a N×M spatial-frequency matrix, wherein the N×M spatial-frequency matrix comprises M N-dimensional precoding vectors, each precoding vector is applied to one of M frequency bands, the N×M spatial-frequency matrix is generated by performing weighted combination on a plurality of spatial-frequency component matrices, each of the plurality of spatial-frequency component matrices is constructed based on two vectors, one of the two vectors is constructed based on one of the K N-dimensional spatial-domain component vectors, the other one of the two vectors is constructed based on one of the L M-dimensional frequency-domain component vectors, and the weight matrix is a matrix formed by weights of the plurality of spatial-frequency component matrices, wherein M>1, N>2, K>1, L>1, and M, N, K, and L are all integers; and
sending the indication information.

39. The communications chip according to claim 38, wherein amplitudes of elements in the weight matrix form an amplitude matrix; and the indication information indicates the following information of the amplitude matrix:

a first location set in the amplitude matrix, a quantized value of an element corresponding to the first location set, and a quantized value of another element in the amplitude matrix other than the element corresponding to the first location set, wherein a quantization scheme of the element corresponding to the first location set is different from a quantization scheme of the another element in the amplitude matrix.

40. The communications chip according to claim 38, wherein phases of elements in the weight matrix form a phase matrix; and the indication information indicates the following information of the phase matrix:

a second location set in the phase matrix, a quantized value of an element corresponding to the second location set, and a quantized value of another element in the phase matrix other than the element corresponding to the second location set, wherein a quantization scheme of the element corresponding to the second location set is different from a quantization scheme of the another element in the phase matrix.

41. The communications chip according to claim 40, wherein a location of the second location set in the phase matrix is the same as a location of a first location set in an amplitude matrix, the amplitude matrix is a matrix formed by amplitudes of the elements in the weight matrix, the first location set is a set formed by a location of at least one element in the amplitude matrix, and the quantization scheme of the element corresponding to the first location set is different from the quantization scheme of the element in the amplitude matrix other than the element corresponding to the first location set.

42. The communications chip according to claim 38, wherein the L M-dimensional frequency-domain component vectors are selected from a frequency-domain component vector set, and the frequency-domain component vector set comprises at least two frequency-domain component vector subsets; and the indication information comprises an index of a frequency-domain component vector subset to which the L M-dimensional frequency-domain component vectors belong and a number of combinations of the L M-dimensional frequency-domain component vectors in the frequency-domain component vector subset, that indicate the L M-dimensional frequency-domain component vectors.

* * * * *

UNITED STATES PATENT AND TRADEMARK OFFICE
CERTIFICATE OF CORRECTION

PATENT NO. : 11,652,518 B2
APPLICATION NO. : 17/486478
DATED : May 16, 2023
INVENTOR(S) : Xiaohan Wang, Huangping Jin and Xiaoyan Bi It is certified that error appears in the above-identified patent and that said Letters Patent is hereby corrected as shown below:

In the Claims

Column 49 / Line 47 – In Claim 12, delete "$L \geq 1$and" and insert -- $L \geq 1$, and --.

Column 51 / Line 35 – In Claim 23, delete "$M>1, N>2, K>1, L>1$," and insert -- $M \geq 1, N \geq 2, K \geq 1, L \geq 1$, --.

Column 52 / Line 45 – In Claim 28, delete "$M>1, N>2, K>1, L>1$," and insert -- $M \geq 1, N \geq 2, K \geq 1, L \geq 1$, --.

Column 53 / Line 55 – In Claim 33, delete "$M>1, N>2, K>1, L>1$," and insert -- $M \geq 1, N \geq 2, K \geq 1, L \geq 1$, --.

Column 54 / Line 63 – In Claim 38, delete "$M>1, N>2, K>1, L>1$," and insert -- $M \geq 1, N \geq 2, K \geq 1, L \geq 1$, --.

Signed and Sealed this
Eighth Day of August, 2023

*Katherine Kelly Vidal*

Katherine Kelly Vidal
*Director of the United States Patent and Trademark Office*